US012632995B2

(12) United States Patent
Oh et al.

(10) Patent No.: US 12,632,995 B2
(45) Date of Patent: May 19, 2026

(54) POINT CLOUD DATA TRANSMISSION METHOD, POINT CLOUD DATA TRANSMISSION DEVICE, POINT CLOUD DATA RECEPTION METHOD, AND POINT CLOUD DATA RECEPTION DEVICE

(71) Applicant: LG Electronics Inc., Seoul (KR)

(72) Inventors: Hyunmook Oh, Seoul (KR); Hyejung Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 146 days.

(21) Appl. No.: 18/549,095

(22) PCT Filed: Mar. 3, 2022

(86) PCT No.: PCT/KR2022/003009
§ 371 (c)(1),
(2) Date: Sep. 5, 2023

(87) PCT Pub. No.: WO2022/186626
PCT Pub. Date: Sep. 9, 2022

(65) Prior Publication Data
US 2024/0062428 A1 Feb. 22, 2024

(30) Foreign Application Priority Data

Mar. 5, 2021 (KR) ........................ 10-2021-0029566

(51) Int. Cl.
G06T 9/00 (2006.01)
G06T 9/40 (2006.01)
(52) U.S. Cl.
CPC ................ G06T 9/001 (2013.01); G06T 9/40 (2013.01)
(58) Field of Classification Search
CPC .................................. G06T 9/001; G06T 9/40
(Continued)

(56) References Cited

U.S. PATENT DOCUMENTS

2010/0082703 A1 4/2010 Zhou et al.
2012/0236934 A1* 9/2012 Chen ..................... H04N 19/597
375/E7.076
(Continued)

FOREIGN PATENT DOCUMENTS

KR 10-2020-0067112 6/2020
WO 2019/070952 A1 4/2019
(Continued)

OTHER PUBLICATIONS

Office Action in Japanese Appln. No. 2023-554037, mailed on Jun. 25, 2024, 7 pages (with English translation).
(Continued)

*Primary Examiner* — Allen C Wong
(74) *Attorney, Agent, or Firm* — Fish & Richardson P.C.

(57) ABSTRACT

A point cloud data transmission method according to embodiments may comprise the steps of: encoding point cloud data; and transmitting a bitstream including the point cloud data. Also, a point cloud data transmission device according to embodiments may comprise: an encoder that encodes point cloud data; and a transmitter that transmits a bitstream including the point cloud data. In addition, a point cloud data reception method according to embodiments may comprise the steps of: receiving a bitstream including point cloud data; and decoding the point cloud data. Furthermore, a point cloud data reception device according to embodiments may comprise: a receiver that receives a bitstream including point cloud data; and a decoder that decodes the point cloud data.

15 Claims, 24 Drawing Sheets

(58) Field of Classification Search
USPC ..................................................... 375/240.01
See application file for complete search history.

(56) References Cited

U.S. PATENT DOCUMENTS

| 2019/0116357 | A1 | | 4/2019 | Tian et al. |
| 2019/0197739 | A1 | * | 6/2019 | Sinharoy ................... G06T 9/00 |
| 2020/0074728 | A1 | | 3/2020 | Meeussen et al. |
| 2020/0304823 | A1 | | 9/2020 | Yea et al. |
| 2021/0142523 | A1 | * | 5/2021 | Sugio ...................... G06T 9/001 |

FOREIGN PATENT DOCUMENTS

| WO | WO 2019/236366 | A1 | 12/2019 |
| WO | WO 2020/190093 | | 9/2020 |
| WO | WO 2020/197966 | A1 | 10/2020 |
| WO | WO 2021/002665 | A1 | 1/2021 |

OTHER PUBLICATIONS

Extended European Search Report in European Appln. No. 22763607.
3, mailed on Jan. 29, 2025, 9 pages.

* cited by examiner

FIG. 2 positions attributes

40000 ~ Transform coordinates

40001 ~ Quantize and remove points (voxelize)

40002 ~ Analyze octree

40003 ~ Analyze surface approximation

40005 ~

40004 ~ Arithmetic encode

Reconstruct geometry

Transform colors ~ 40006

Transfer attributes ~ 40007

~ 40008

RAHT

Gnnerate LOD ~ 40009

Lifting ~ 40010

Quantize coefficients ~ 40011

Arithmetic encode ~ 40012 geometry bitstream atribute bitstream $$1 + 2 + 4 + 8 = 15$$

Level of details split and populated flags

16001 — *split flag =0*

16002 — *split flag =1 0000*
*pop flag =1000*

16003 — *split flag =1 1010*
*pop flag =01 1001 1000* populated    unsplit    1st order split
LPU

LPU split into PUs

2nd order split $C(V_1)=D(V_1)+\mu E(V_1)+\lambda R(V_1)$ $C = C(V_1) + C(V_4)+\lambda R_{split}(10000)+\lambda R_{pop}(1001)$ $C(V_4)=D(V4)+\mu E(V_4)+\lambda R(V_4)$

FIG. 23

| data_unit_header ( ) { | Descriptor |
|---|---|
| ...... | |
| ref_frame_id | u(8) |
| mv_depth_start | u(8) |
| mv_depth_end | u(8) |
| ...... | |
| } | |

FIG. 24

| data_unit ( ) { | Descriptor |
|---|---|
| ...... | |
| for (i = mv_depth_start; i < maxDepth; i++) { | |
| for(j = all nodes in depth i) { | |
| if (i <= mv_depth_end && parentSplitFlag == 1) { | |
| split_flag[i][j] | u(1) |
| if(split_flag[i][j] == 0) { | |
| population_flag[i][j] | u(1) |
| if(population_flag[i][j] == 1) { | |
| for(k=0; k<3; k++) { | |
| motion_vector[i][j][k] | u(8) |
| residual[i][j][k] | u(8) |
| } | |
| } | |
| } | |
| } | |
| else { | |
| for(k=0; k<3; k++) | |
| residual[i][j][k] | u(8) |
| } | |
| } | |
| } | |
| ...... | |
| } | |

FIG. 26

ENCODE POINT CLOUD DATA ~ S2900

TRANSMIT BITSTREAM INCLUDING POINT CLOUD DATA ~ S2910

RECEIVE BITSTREAM INCLUDING POINT CLOUD DATA ~ S3000

DECODE POINT CLOUD DATA ~ S3010

POINT CLOUD DATA TRANSMISSION METHOD, POINT CLOUD DATA TRANSMISSION DEVICE, POINT CLOUD DATA RECEPTION METHOD, AND POINT CLOUD DATA RECEPTION DEVICE

CROSS-REFERENCE TO RELATED APPLICATIONS

This application is a National Stage application under 35 U.S.C. § 371 of International Application No. PCT/KR2022/003009, filed on Mar. 3, 2022, which claims the benefit of Korean Application No. 10-2021-0029566, filed on Mar. 5, 2021. The disclosures of the prior applications are incorporated by reference in their entirety.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method of transmitting point cloud data may include encoding the point cloud data, and transmitting a bitstream containing the point cloud data. A method of receiving point cloud data according to embodiments may include receiving a bitstream containing point cloud data and decoding the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 2 is a block diagram illustrating a point cloud content providing operation according to embodiments;

FIG. 23 shows an example of a data unit header syntax according to embodiments;

FIG. 24 shows an example of a data unit syntax according to embodiments;

FIG. 26 shows an example of a point cloud data receiving method according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
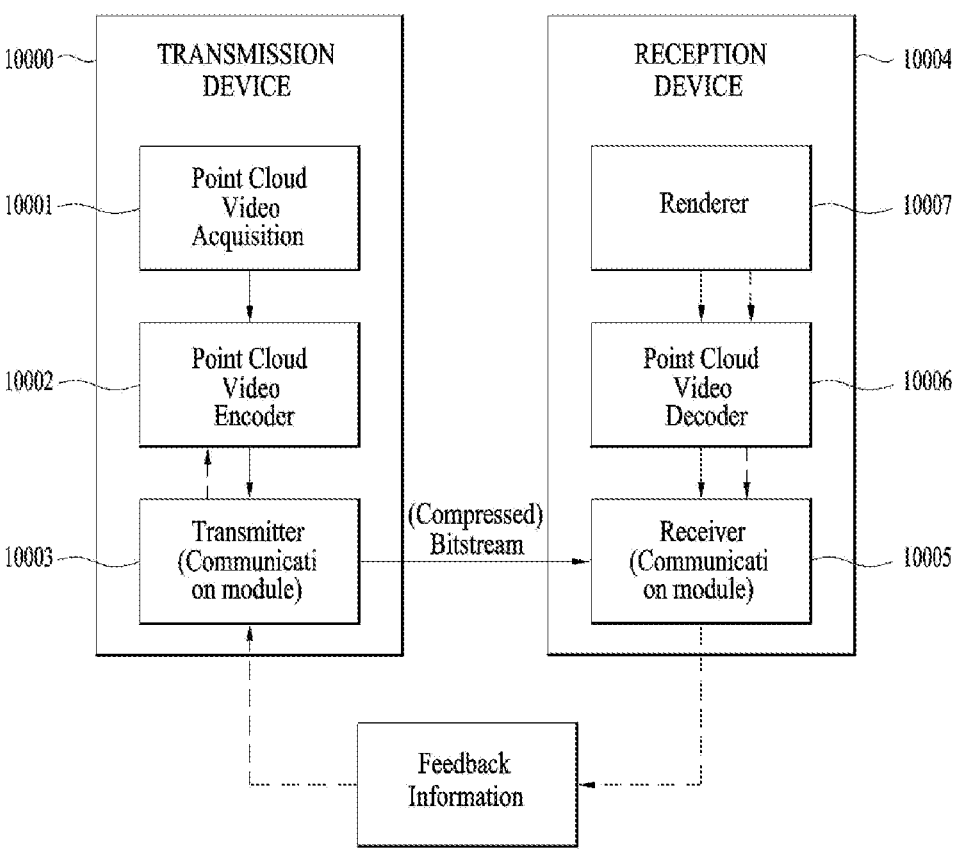
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation.

The point cloud video is point cloud content represented by a point cloud, which is a set of points positioned in a 3D space, and may be referred to as point cloud video data or point cloud data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
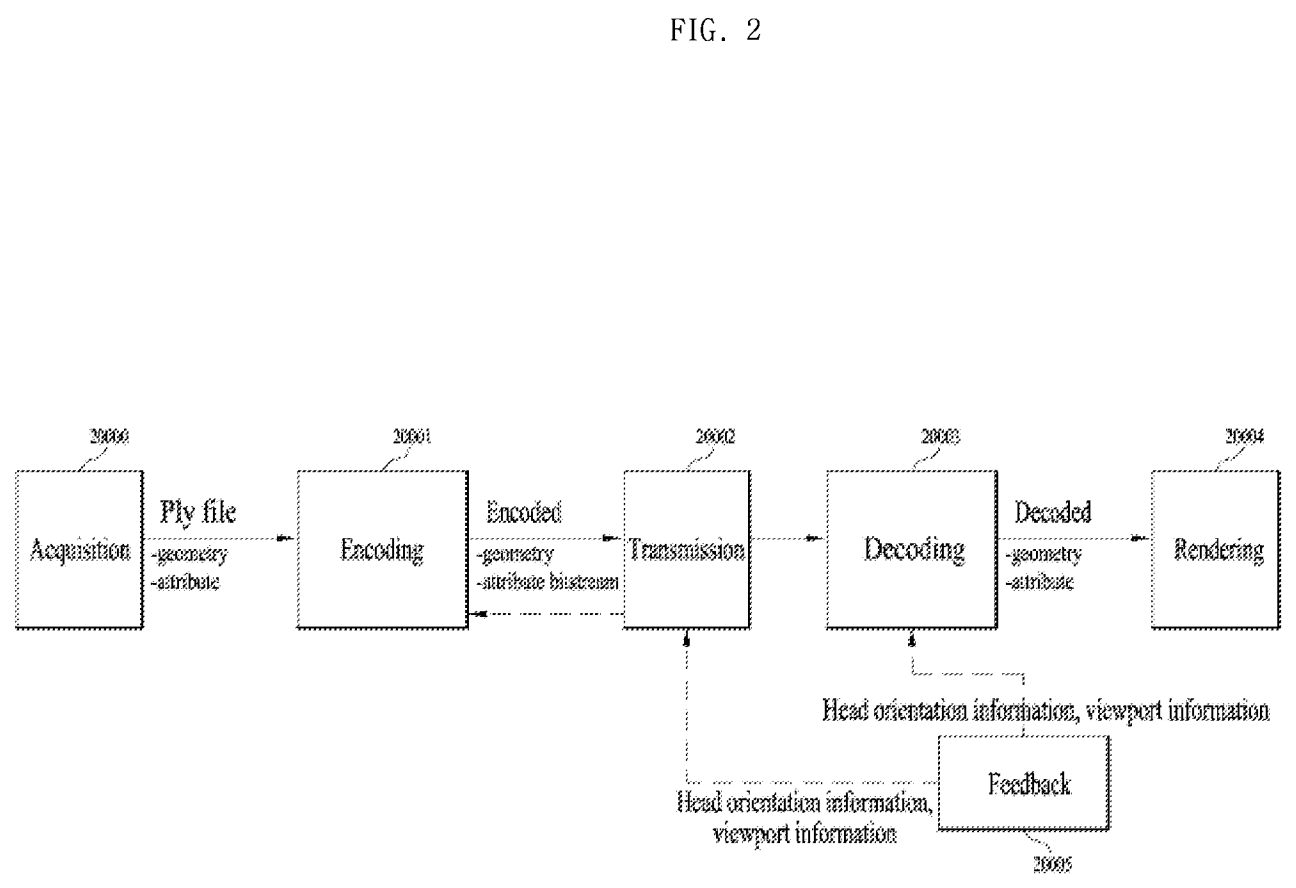

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
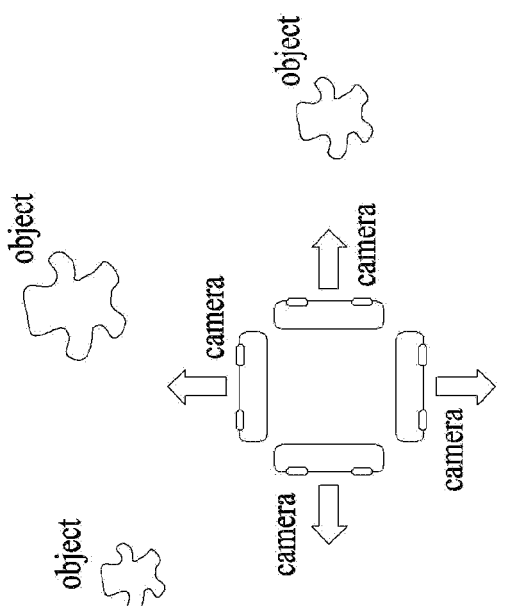
FIG. 3 illustrates an exemplary process of capturing a point cloud video according to embodiments.
Figure 3:
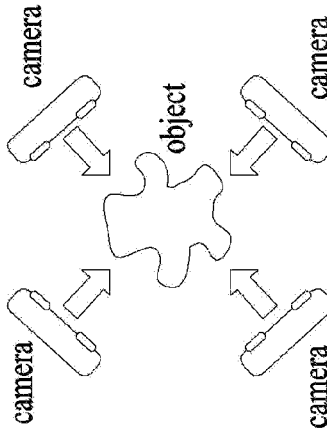

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
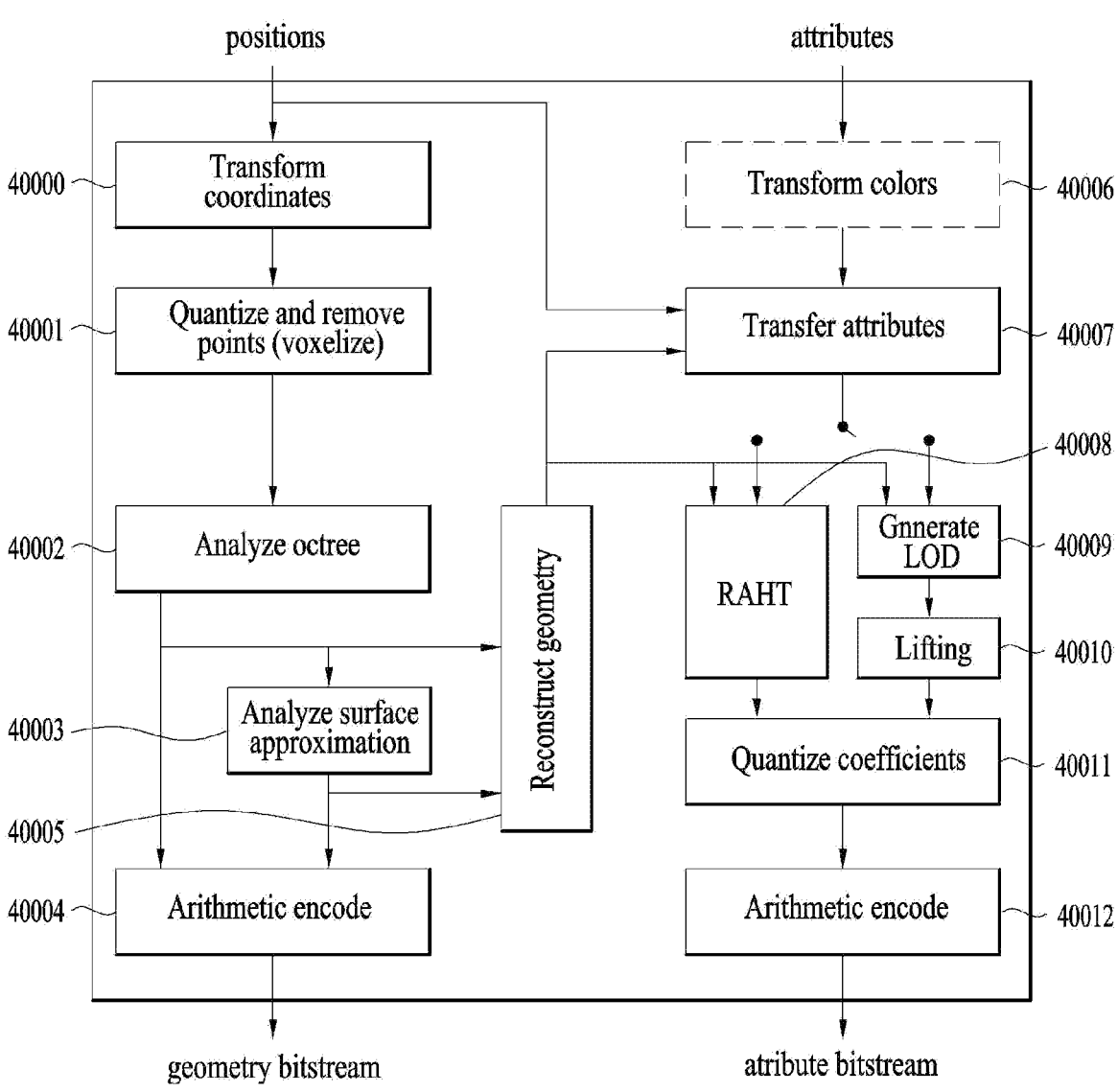
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, predictive tree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree, the predictive tree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) may be performed quickly. The Morton code is generated by presenting coordinates (e.g., (x, y, z)) representing 3D positions of all points as bit values and mixing the bits. For example, when the coordinates indicating the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
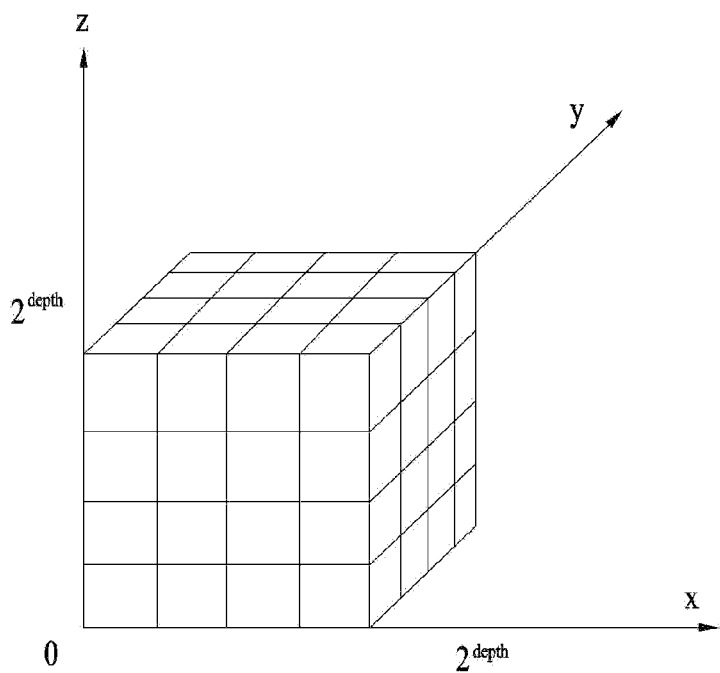
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and $(2^d, 2^d, 2^d)$ is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
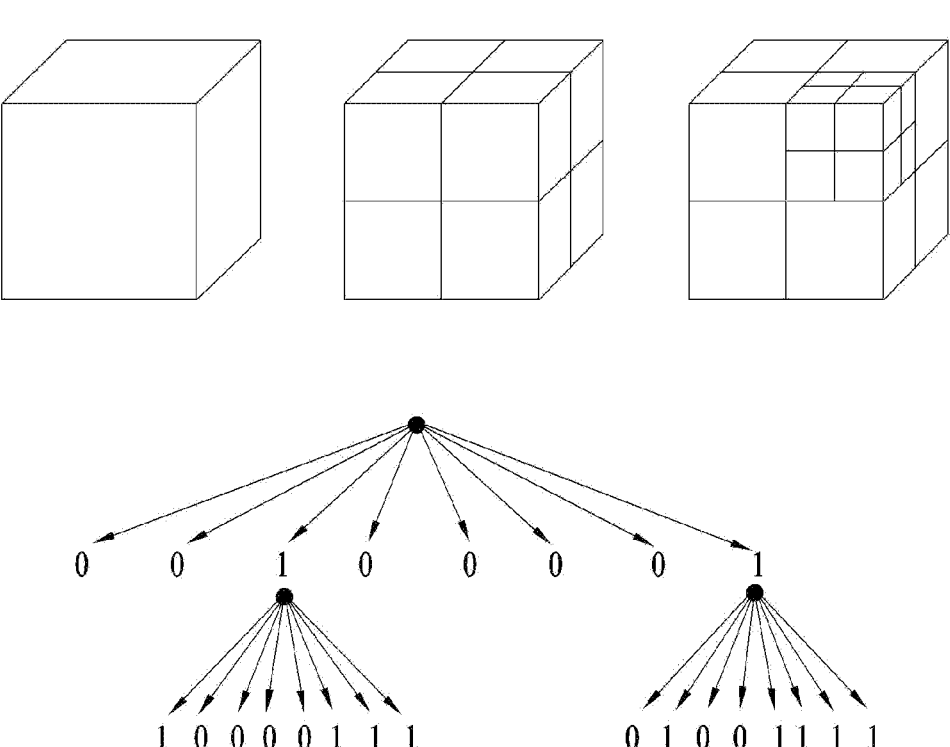
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = Ceil\left(Log2\left(Max\left(x^{int}_n, \ y^{int}_n, \ z^{int}_n, \ n = 1, \ \ldots, \ N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta$x, $\Delta$y, $\Delta$z) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\text{i)} \begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix};$$

$$\text{ii)} \begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$

$$\text{iii)} \begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of $\theta$ is estimated through atan 2(bi, ai), and the vertices are ordered based on the value of $\theta$. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

Triangles formed from vertices ordered 1, . . . , n n triangles
3 (1,2,3)
4 (1,2,3), (3,4,1)
5 (1,2,3), (3,4,5), (5,1,3)
6 (1,2,3), (3,4,5), (5,6,1), (1,3,5)
7 (1,2,3), (3,4,5), (5,6,7), (7,1,3), (3,5,7)
8 (1,2,3), (3,4,5), (5,6,7), (7,8,1), (1,3,5), (5,7,1)
9 (1,2,3), (3,4,5), (5,6,7), (7,8,9), (9,1,3), (3,5,7), (7,9,3)
10 (1,2,3), (3,4,5), (5,6,7), (7,8,9), (9,10,1), (1,3,5), (5,7, 9), (9,1,5)
11 (1,2,3), (3,4,5), (5,6,7), (7,8,9), (9,10,11), (11,1,3), (3,5,7), (7,9,11), (11,3,7)
12 (1,2,3), (3,4,5), (5,6,7), (7,8,9), (9,10,11), (11,12,1), (1,3,5), (5,7,9), (9,11,1), (1,5,9)

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

Figure 7:
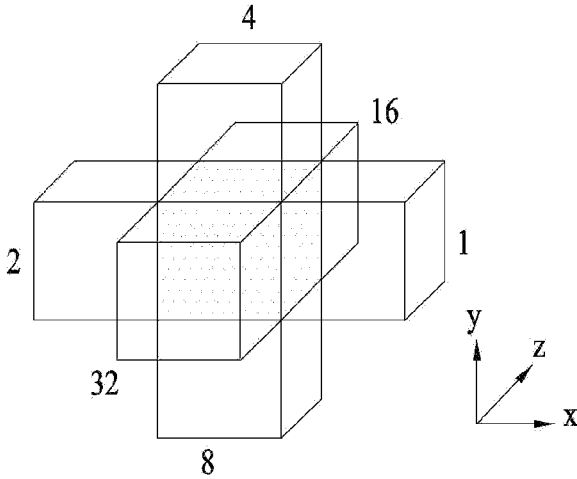
FIG. 7 shows an example of a neighbor node pattern according to embodiments.
Figure 7:
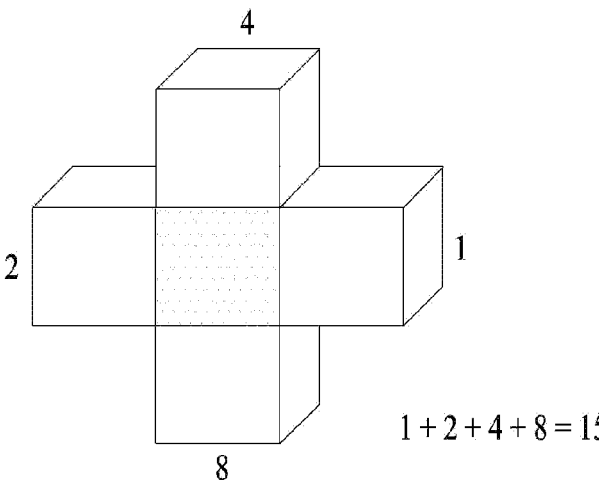

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
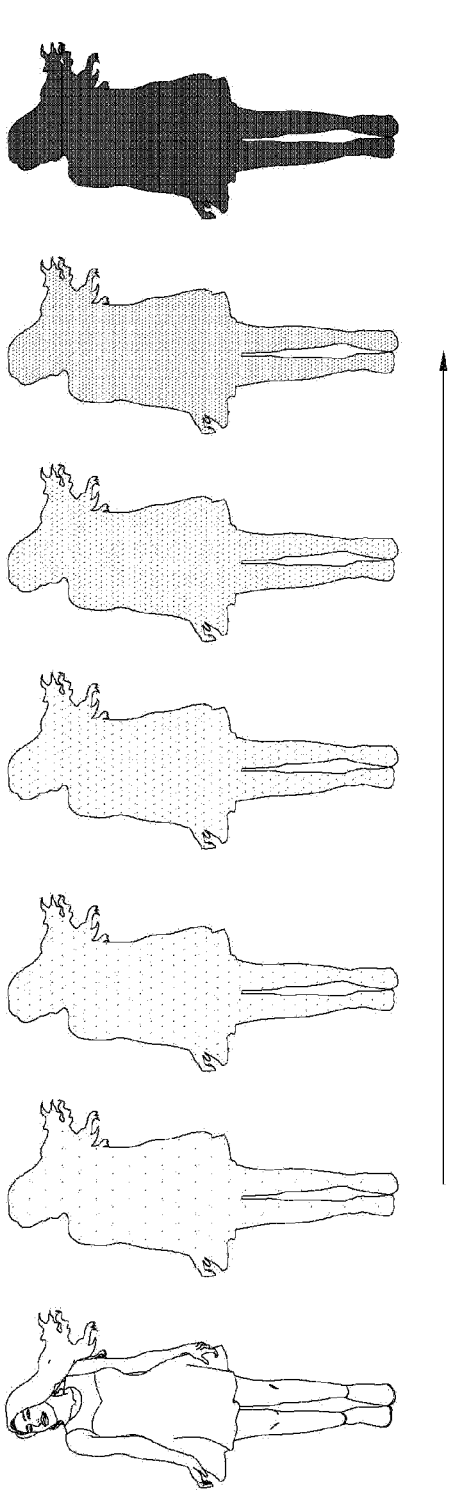
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
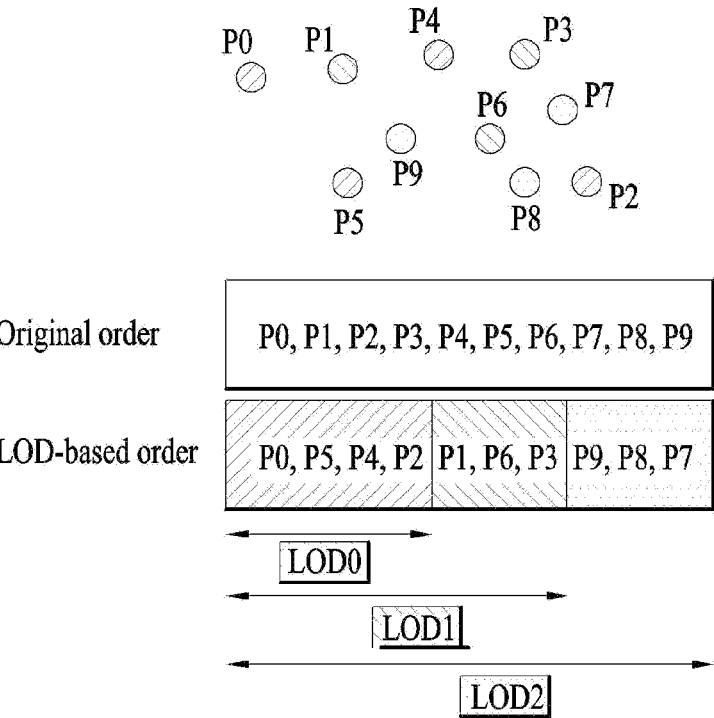
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, attribute residuals or attribute prediction residuals) obtained by subtracting a predicted attribute (attribute value) from the attribute (attribute value) of each point. The quantization process is configured as shown in the following table.

TABLE 1

| Attribute prediction residuals quantization pseudo code |
| --- |
| int PCCQuantization(int value, int quantStep) {<br>if( value >=0) {<br>return floor(value / quantStep + 1.0 / 3.0);<br>} else {<br>return −floor(−value / quantStep + 1.0 / 3.0);<br>}<br>} |

TABLE 2

| Attribute prediction residuals inverse quantization pseudo code |
| --- |
| int PCCInverseQuantization(int value, int quantStep) {<br>if( quantStep ==0) {<br>return value;<br>} else {<br>return value * quantStep;<br>}<br>} |

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, \; T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\,w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
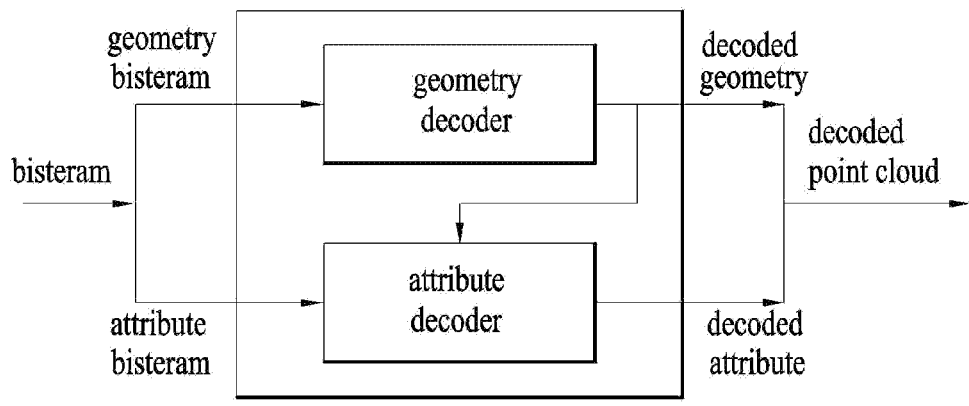
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
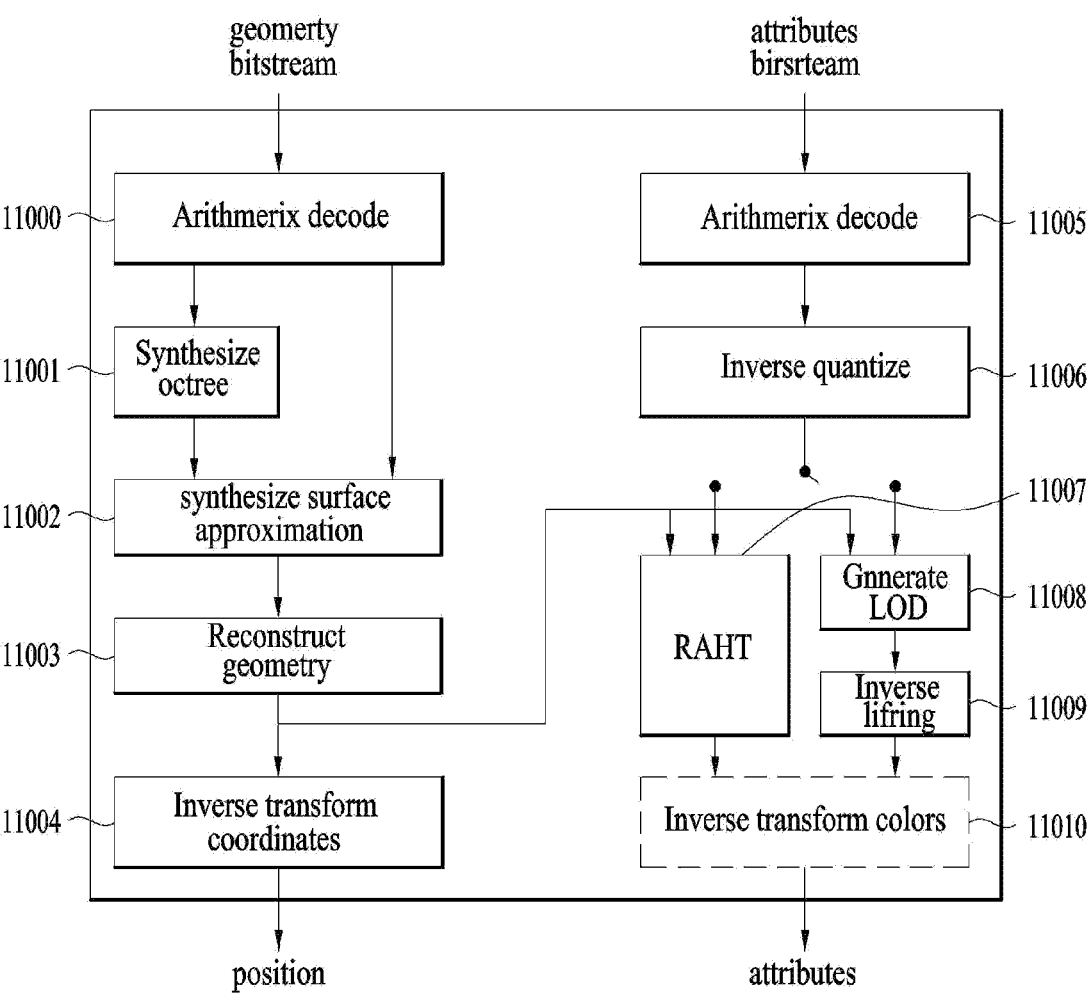
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
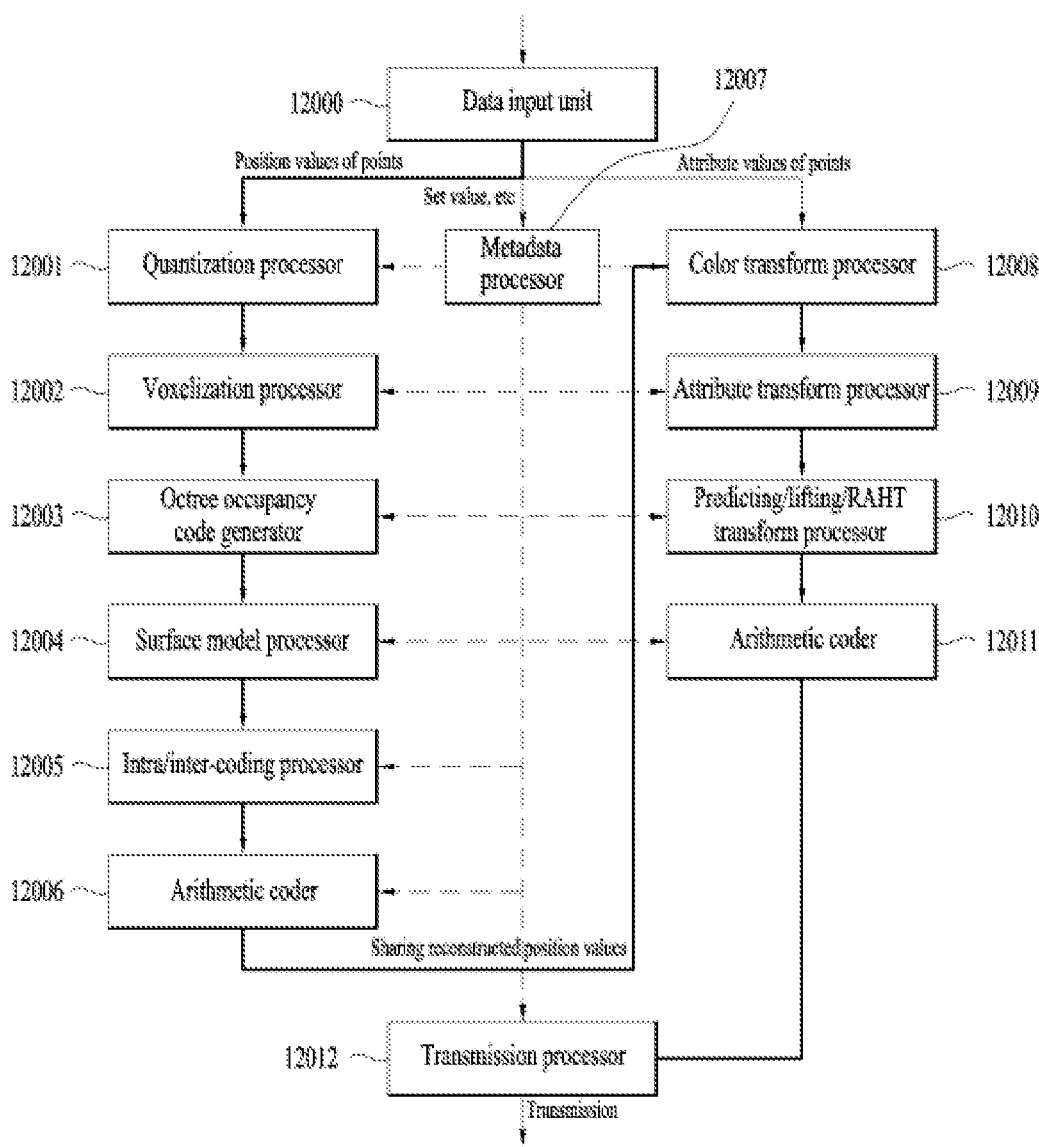
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
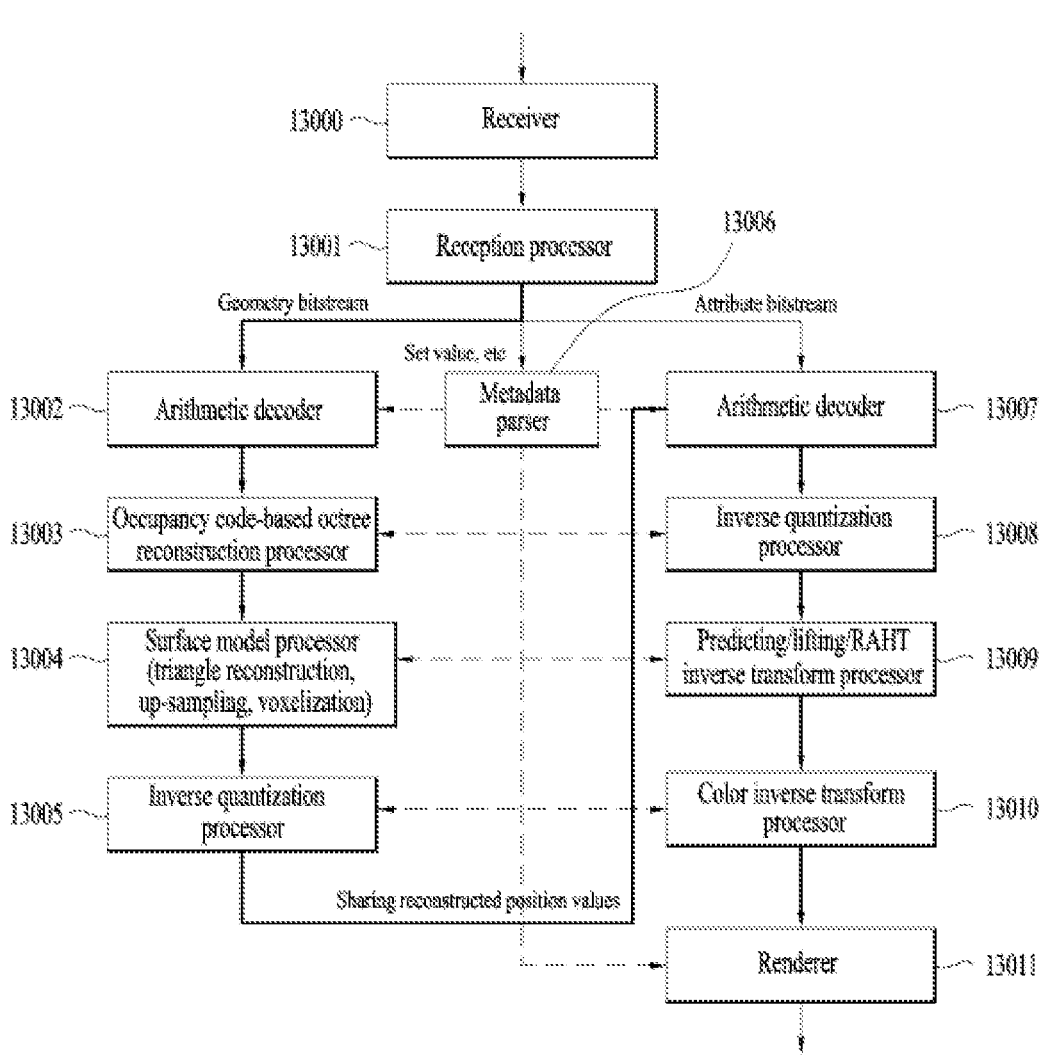
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
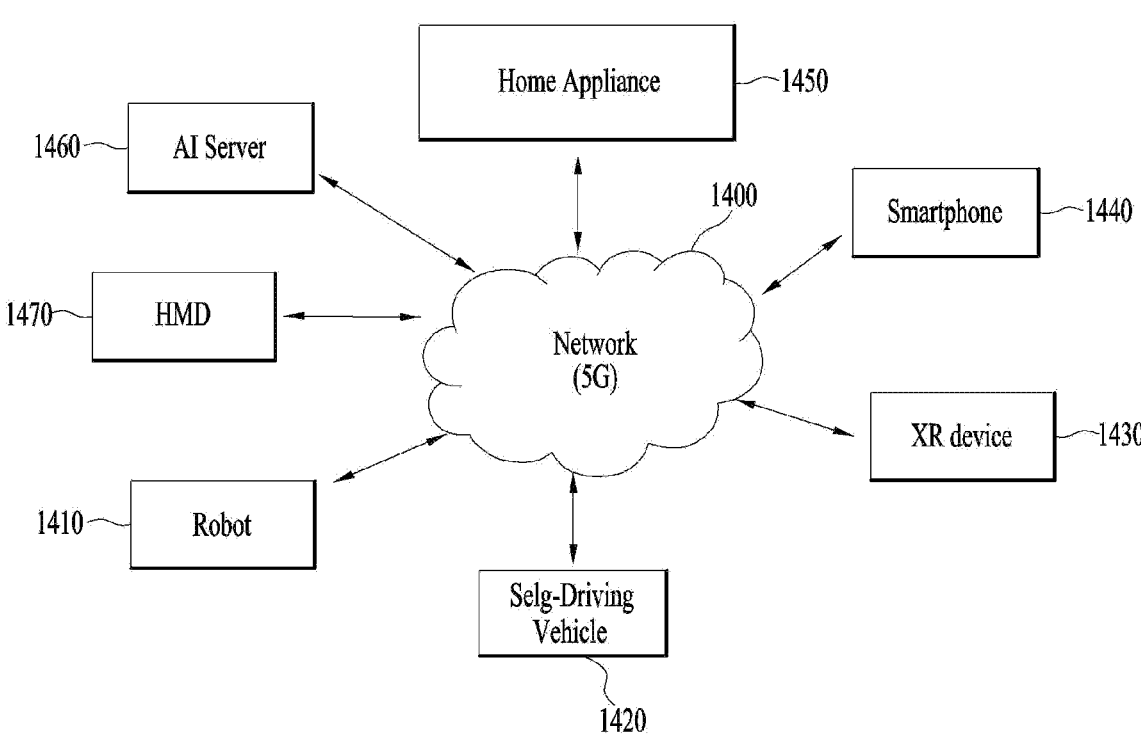
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, point cloud data is composed of a set of points, and each point may have geometry information and attribute information. The geometry information is 3D location information (e.g., coordinate values of x, y, and z axes) of each point. That is, the position of each point is represented by parameters (e.g., parameters (x, y, z) of three axes representing space, X-axis, Y-axis, and Z-axis) on a coordinate system representing a three-dimensional space. In addition, the attribute information may refer to point color (RGB, YUV, etc.), reflectance, normal vectors, transparency, or the like. The attribute information may be expressed in the form of scalar or vector.

According to the embodiments, point cloud data may be classified into category 1 of static point cloud data, category 2 of dynamic point cloud data, and category 3 of dynamically acquired point cloud data according to the type and acquisition method of point cloud data. The category 1 consists of a point cloud of a single frame with a high density of points for an object or space. Category 3 data may be classified into frame-based data having a plurality of frames acquired while moving and fused data of a single frame in which a point cloud acquired through a lidar sensor for a large-scale space and a color image obtained as a 2D image are matched.

According to the embodiments, efficiency may be increased by predicting point cloud data from other point cloud data within the same frame in a process of encoding or decoding point cloud data. Prediction between point cloud data belonging to the same frame is called intra-prediction, and represents prediction within a screen.

According to the embodiments, to efficiently compress 3D point cloud data having multiple frames over time, such as frame-based point cloud data having a plurality of frames, inter-prediction may be used. Inter-prediction may be applied to geometry information and/or attribute information. Inter-prediction is inter-screen prediction or inter-frame prediction, and intra-prediction is intra-screen prediction.

Hereinafter, motion estimation related to inter-prediction will be described.

Inter-prediction predicts all or part of a current frame by using information that has a high similarity to the current frame from a coded frame. In this case, a unit for determining a degree of similarity may be referred to as a prediction unit (PU). Inter-prediction may be a prediction method using motion between multiple frames acquired over time, and may be performed through motion vector estimation or motion estimation.

Motion estimation may be divided into global motion estimation, which calculates a motion vector by rotating, moving, expanding, and/or reducing an entire frame, and local motion estimation, which predicts motion of a part of a frame or an object.

Inter-prediction calculates a motion vector based on similarity between point cloud data of a reference frame and point cloud data of current frame, and predicts the point cloud data of the current frame using the motion vector.

Embodiments disclosed in this document proposes a method/apparatus for increasing compression efficiency by compressing attribute information based on inter-prediction. When data having a plurality of consecutive frames is compressed, correlation between adjacent frames may be high, and in this case, compression efficiency may be increased by removing overlapping information between frames.

Embodiments propose attribute compression based on motion estimation and motion compensation and a motion estimation method in consideration of geometry information and attribute information, as inter-prediction-based attribute information compression.

Motion compensation-based point cloud data compression finds motion between a previous frame (or reference frame) and a current frame according to a prediction unit, performs prediction according to a motion vector, and performs compression by comparing a predicted value and a value to be compressed (or an original value) and removing similar information.

Embodiments describe a motion prediction-based attribute compression method based on a motion prediction and motion compensation method used in an octree-based position compression method. According to the embodiments, a method of compressing an attribute based on an octree structure may also be applied to attribute compression based on a structure such as Level of Data (LoD).

Motion estimation may be expressed as motion estimation or motion estimation, and motion compensation may be expressed as motion compensation or motion compensation. A motion vector may be expressed as a motion vector.

Figure 15:
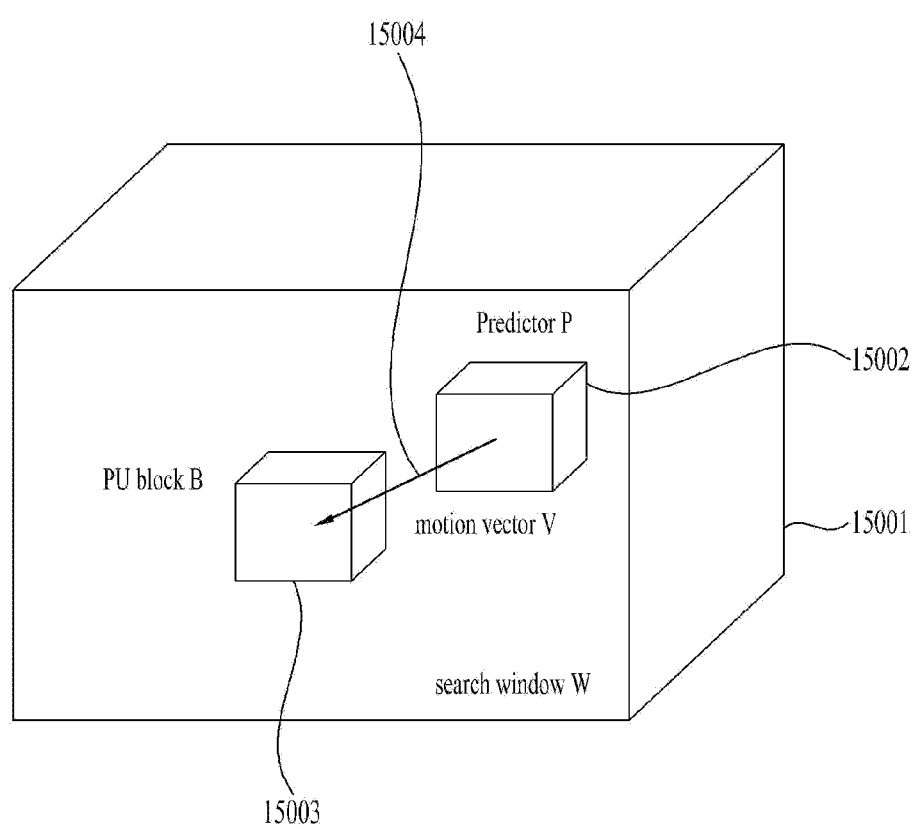
FIG. 15 shows an example of calculation of a motion vector according to the embodiments.

FIG. 15 shows an example of calculation of a motion vector according to the embodiments.

Motion vector calculation according to the embodiments is performed by an encoder/encoding operation or decoder/decoding operation, and a transmitting and receiving device/method described with reference to FIGS. 1, 2, 4, 10, 11, 12, 13, and 25 to 28. In detail, the motion vector calculation may be performed by the intra/inter coding processor 12005 of FIG. 12, the motion estimation of FIG. 25, and the motion estimation operation of FIG. 27.

Motion vector calculation according to the embodiments may be expressed as motion estimation.

Motion estimation may be performed in units of a prediction unit (PU) 15003. The PU 15003 may be defined as a set of adjacent nodes at a certain depth of an octree structure in the current frame, and may be defined as a set of nodes having the same parent node. The parent node may indicate a node of a higher level.

For any PU 15003 defined in the current frame, motion may be estimated as shown in FIG. 15 to estimate similar information in the reference frame. In this case, to increase the efficiency of motion estimation, a motion search window 15001 may be defined for the reference frame, and similarity between information included in the PU 15003 and information included in the search window may be determined. The current frame refers to a frame to be encoded or decoded, and the reference frame refers to a frame referred to for predicting point cloud data of the current frame in an encoding or decoding process. The current frame and the reference frame may also be referred to as a first frame and a second frame, respectively. In addition, the reference frame may be referred to in various ways depending on the characteristics of the referenced frame, such as a previous frame or a subsequent frame.

In this case, to increase the accuracy of similarity determination, position distribution characteristics and attribute distribution characteristics of points included in the PU 15003 may be considered together. When a set of points belonging to the PU 15003 of the current frame is defined as block B, and a set of points belonging to an arbitrary prediction candidate defined within a search window W in the reference frame is a predictor candidate P 15002, a difference D (B, P) between B and P may be defined as a function of a difference between geometry information and attribute information of each point as follows. In the function D (B, P), when the points belonging to B and P are b and p, the position of each point is defined as b (x,y,z) and p (x,y,z), and the attribute is b (r,g,b,R) and p (r,g,b,R) are defined and expressed. The motion estimation method proposed by the embodiments may be applied to both attribute compression and position compression.

Figure 16:
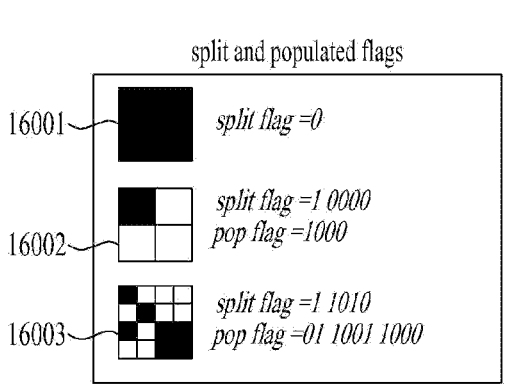
FIG. 16 shows an example of flag information indicating whether an octree node is split or occupied according to embodiments.
Figure 16:
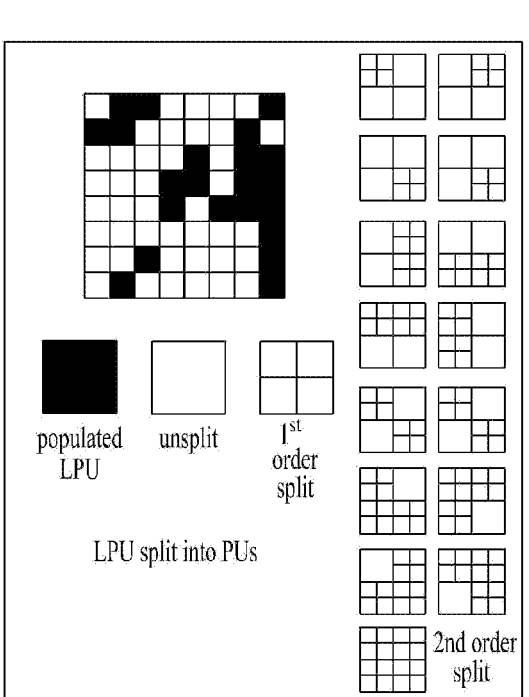

1) $D(B, P) = \sum_{b \in B}$ $\log_2\left(1 + \min_{p \in P} (\|b(x, y, z) - p(x, y, z)\|_L + \|b(r, g, b, R) - p(r, g, b, R)\|_L)\right)$ 2) $D(B, P) = \sum_{b \in B} \log_2\left(1 + \min_{p \in P} (\|b(x, y, z) - p(x, y, z)\|_L)\right) +$ $\|\overline{b(r, g, b, R)} - \overline{p(r, g, b, R)}\|_L$ 3) $D(B, P) = \sum_{b \in B} \log_2\left(1 + \min_{p \in P} (\|b(x, y, z) - p(x, y, z)\|_L)\right) +$ $\sum_{b \in B} \log_2\left(1 + \min_{p \in P} (\|b(r, g, b, R) - p(r, g, b, R)\|_L)\right)$ FIG. 16 shows an example of flag information indicating whether an octree node is split or occupied according to embodiments. As shown in FIG. 16, split flag information and pop flag information may be signaled according to a state in which the octree node is split and occupied.

Referring to a left side of FIG. 16, a split flag of 0 may be signaled for a node 16001 that is not split. When a node is split and one of split lower nodes is occupied (16002), the split flag may be signaled to 1 0000 and the pop flag may be signaled to 1000. In addition, when a node is split and some of lower nodes thereof are split again (16003), the split flag may be 1 1010 and the pop flag may be 01 1001 1000.

A right side of FIG. 16 shows the case in which an LPU is split into PUs. Populated LPUs are shaded. Also, the cases of non-split, $1^{st}$ order split, and $2^{nd}$ order split are shown in the drawings.

In addition, the transmitting and receiving device/method according to the embodiments may define a cost function using a cumulative value of costs of the lower prediction unit according to the following equation to determine whether to split an octree node for each octree depth. The cost function below may include a term representing, as a cost, a generated error and a used bit when a motion vector is used, or calculation in the case of splitting a node. Accordingly, whether an octree is split may be determined in a direction in which the cost calculated by the cost function is smallest. That is, according to the embodiments, the cost of splitting an octree node and the cost of transmitting a motion vector may be compared with each other to determine an encoding process with a lower cost.

$$C(V) = \sum_i D(B, P(W, V_i)) + \lambda_1 R(V_i) + \lambda_2 R\left(\frac{split}{populatoin}flags\right)$$

Figure 17:
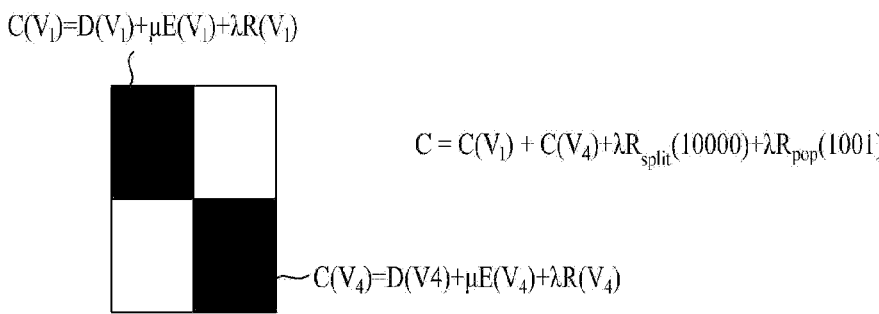
FIG. 17 shows an example of calculation of a cost function of an octree node according to embodiments.

FIG. 17 shows an example of calculation of a cost function of an octree node according to embodiments.

FIG. 17 shows an example of cost function calculation (C(V1), C(V4)) of an occupied node among split lower nodes and an example (C) of cost function calculation of all nodes. Here, E is a term representing an error.

The transmitting and receiving device/method according to the embodiments may select an efficient method for whether to split an octree node or apply a motion vector by using the above-described cost function.

Use of a cost function according to the embodiments may be performed by the encoder/encoding operation and the transmitting device/method described with reference to FIGS. 1, 2, 4, 12, and 25. The transmitting device/method according to the embodiments may signal information on whether a node is split and whether a motion vector is transmitted, and the receiving device/method according to the embodiments (FIGS. 10, 11, 13, 26, and 28) may decode point cloud data based on the received signaling information.

Figure 18:
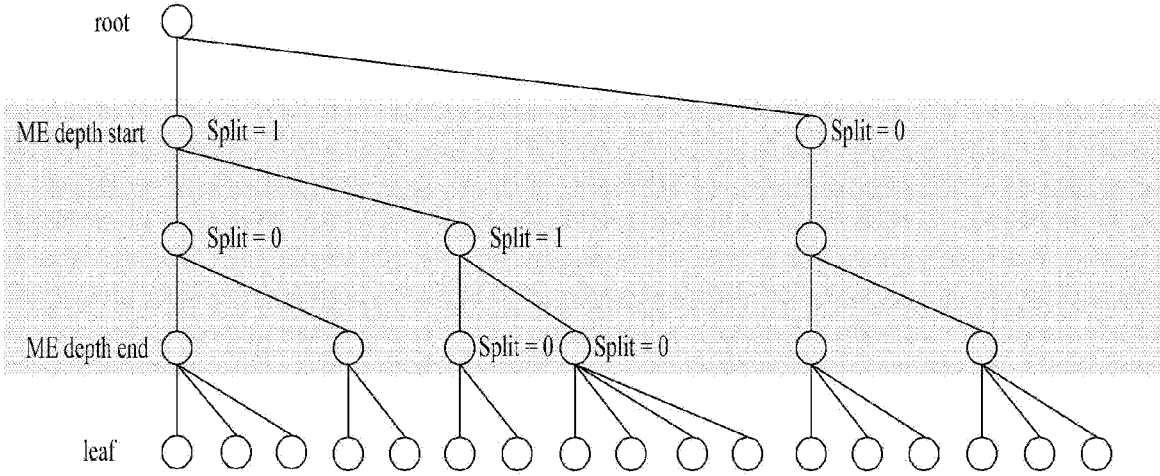
FIG. 18 shows an example in which motion estimation is performed in an octree structure according to embodiments.

FIG. 18 shows an example in which motion estimation is performed in an octree structure according to embodiments.

A transmitting and receiving device/method according to the embodiments may perform motion estimation within a specific depth range of an octree structure. Motion estimation according to the embodiments may be performed by the encoder/encoding operation or the decoder/decoding operation, transmitting and receiving device/method described with reference to FIGS. 1, 2, 4, 10, 11, 12, 13, and 25 to 28.

As shown in FIG. 18, a motion vector search process is performed for point cloud data having an octree structure like in FIG. 15. An octree depth range in which motion estimation is performed in an octree structure ranging from a root to a leaf is shaded. When a cost of the cost function is less than that of splitting a motion vector (MV) without splitting for a specific node, split may be set to 0 and a motion vector may be applied to the node. Conversely, when splitting a node costs a smaller cost function than transferring a motion vector (MV), the node may be split and the motion vector may be transferred from a lower node.

Referring to FIG. 18, ME depth start and ME depth end may indicate a range of octree depth (or level) in which motion estimation according to the embodiments is performed. In FIG. 18, it is determined whether motion estimation is performed from a next lower node of a root node to an immediate higher node of a leaf node. A node with a split of 0 is a node that is not split because the cost of the cost function is small to transmit the motion vector, and a node with a split of 1 is a node that is additionally split because the cost of the cost function is small to split.

Figure 19:
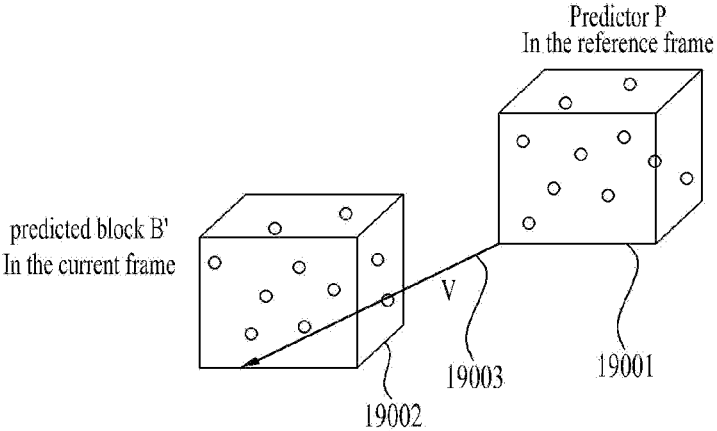
FIG. 19 shows an example showing a predicted block B' 19002 predicted from a predictor P 19001 of a reference frame according to embodiments.

FIG. 19 shows an example showing a predicted block B' 19002 predicted from a predictor P 19001 of a reference frame according to embodiments.

Predicting a predicted block B' from a reference frame based on a motion vector calculated according to the embodiments may be shown as motion compensation. Motion compensation according to the embodiments may be performed by the encoder/encoding operation or decoder/ decoding operation, and transmitting and receiving device/method described with reference to FIGS. 1, 2, 4, 10, 11, 12, 13, and 25 to 28. In detail, the motion compensation may be performed by the motion compensation unit of FIGS. 25 and 26, the motion compensation operation of FIG. 27, and the inter-frame attribute prediction of FIG. 28.

In an inter-prediction-based attribute compression method according to the embodiments, a predictor P may be specified based on information on a motion vector V for a reference frame. When a position of a block of a prediction unit in which prediction for the current frame is performed is B (x,y,z) and the motion vector V 19003 is V (x,y,z), a position P (x,y,z) of the predictor P 19001 may be defined as follows.

$$P(x,y,z)=B(x,y,z)+V(x,y,z)$$

A block position may be defined as a minimum value for each axis of a bounding box for points included in a block. Based on the predictor P 19001 defined in the reference frame, a prediction target B of the current frame may be predicted. When prediction for the prediction unit of the current frame is the predicted block B' 19002, occupancy of points belonging to B' complies with occupancy of P, and the position and attribute of points b' belonging to B' may be defined for the position and attribute of points p belonging to P.

$$Occupancy\ of\ B'=occupancy\ of\ P$$

$$b'(x,y,z)=p(x,y,z)-V(x,y,z)$$

$$b'(r,g,b,R)=p(r,g,b,R)$$

A representative attribute of the predicted block B' 19002 of B predicted by the predictor P 19001 may be defined as follows.

1) $B'(r, g, b, R) = \text{avg}\{b'(r, g, b, R)\}$

2) $B'(r, g, b, R) = \text{med}\{b'(r, g, b, R)\}$

3) $B'(r, g, b, R) = \frac{1}{N(T)}\sum_{b' \in T}^{\square} b'(r, g, b, R) - \frac{1}{N(H)}\sum_{b' \in M}^{\square}$ $$b'(r, g, b, R) - \frac{1}{N(L)}\sum_{b' \in L}^{\square} b'(r, g, b, R)$$

avg{ } and med{ } may be functions that output an average or median value, and T, H, and L may represent an entire set, a set of points belonging to the top a % and bottom b % when listed in ascending order. N( ) may indicate the number of points belonging to the set, and a representative attribute may be defined as an average of points belonging to a predefined range.

When the point cloud data transmitting device according to the embodiments predicts the point cloud data of the current frame during encoding, the point cloud data of the current frame may be predicted using point cloud data information of the reference frame. For example, as shown in FIG. 19, motion compensation may be performed as much as a motion vector V 19003 from the predictor P 19001 of the reference frame, and thus the predicted block B' 19002 of the current frame may be predicted.

Points belonging to the predicted block B' 19002 according to the embodiments may be prediction points for the current frame. Attribute information of points belonging to the predicted block B' 19002 may be predicted as attribute information of points belonging to the predictor P 19001 of the reference frame calculated according to the embodiments. In detail, attribute information of points belonging to the predicted block B' 19002 may be predicted as an average attribute value or a median attribute value of points belonging to the predictor P 19001 and may be predicted based on an average of attribute values of some of the points belonging to the predictor P 19001.

Attribute compression based on inter-frame correlation may be performed through the above motion estimation process and motion compensation process.

Figure 25:
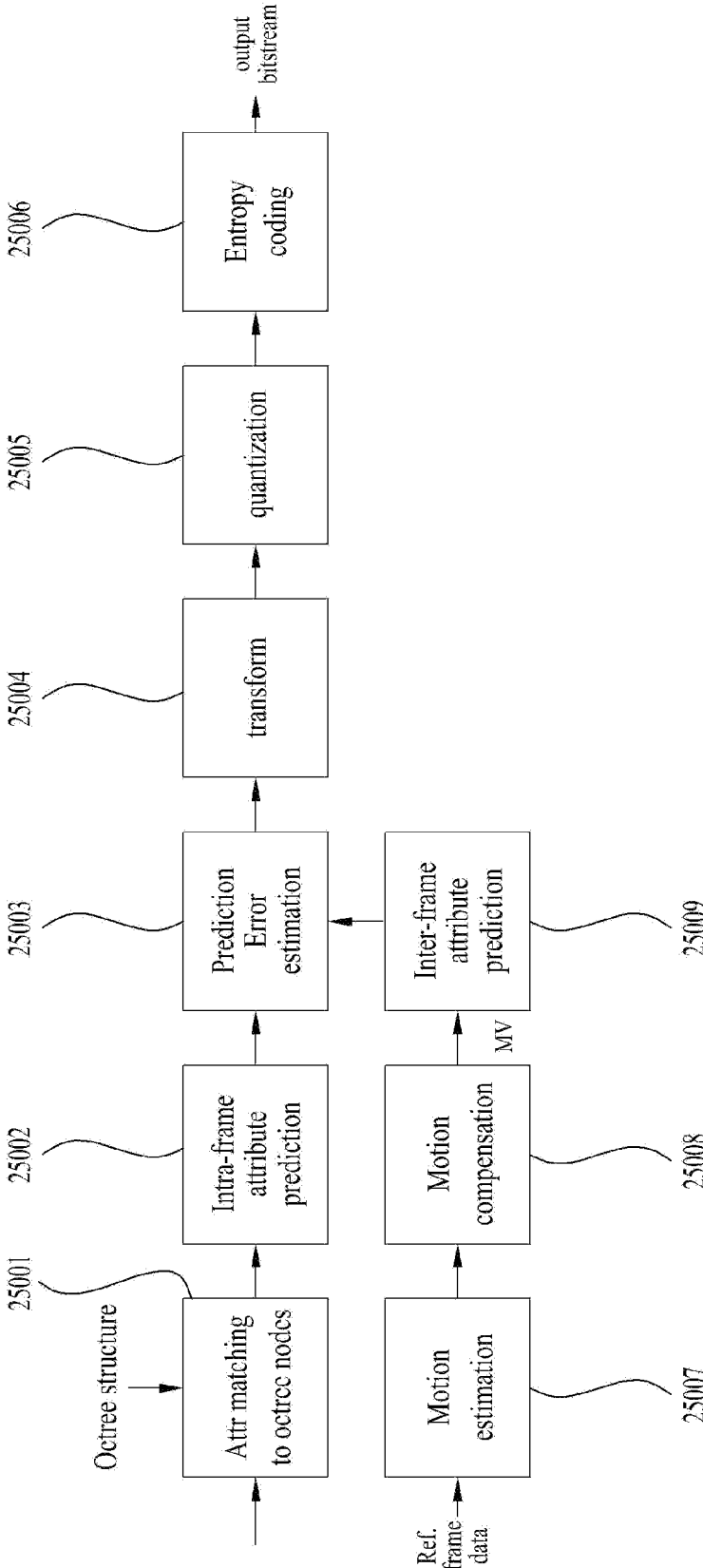
FIG. 25 shows an example of a point cloud data transmitting method according to embodiments.

The above-described point cloud data processing according to the embodiments may be performed by a point cloud data transmitting device according to the embodiments (e.g., the point cloud video encoder 10002 of FIG. 1, the encoding 20001 of FIG. 2, the encoder of FIG. 4, the transmitting device of FIG. 12, the XR device 1430 of FIG. 14, the transmitting device of FIG. 25, hardware including one or more processors or integrated circuits configured to communicate with one or more memories, software, firmware, or a combination thereof).

Figure 26:
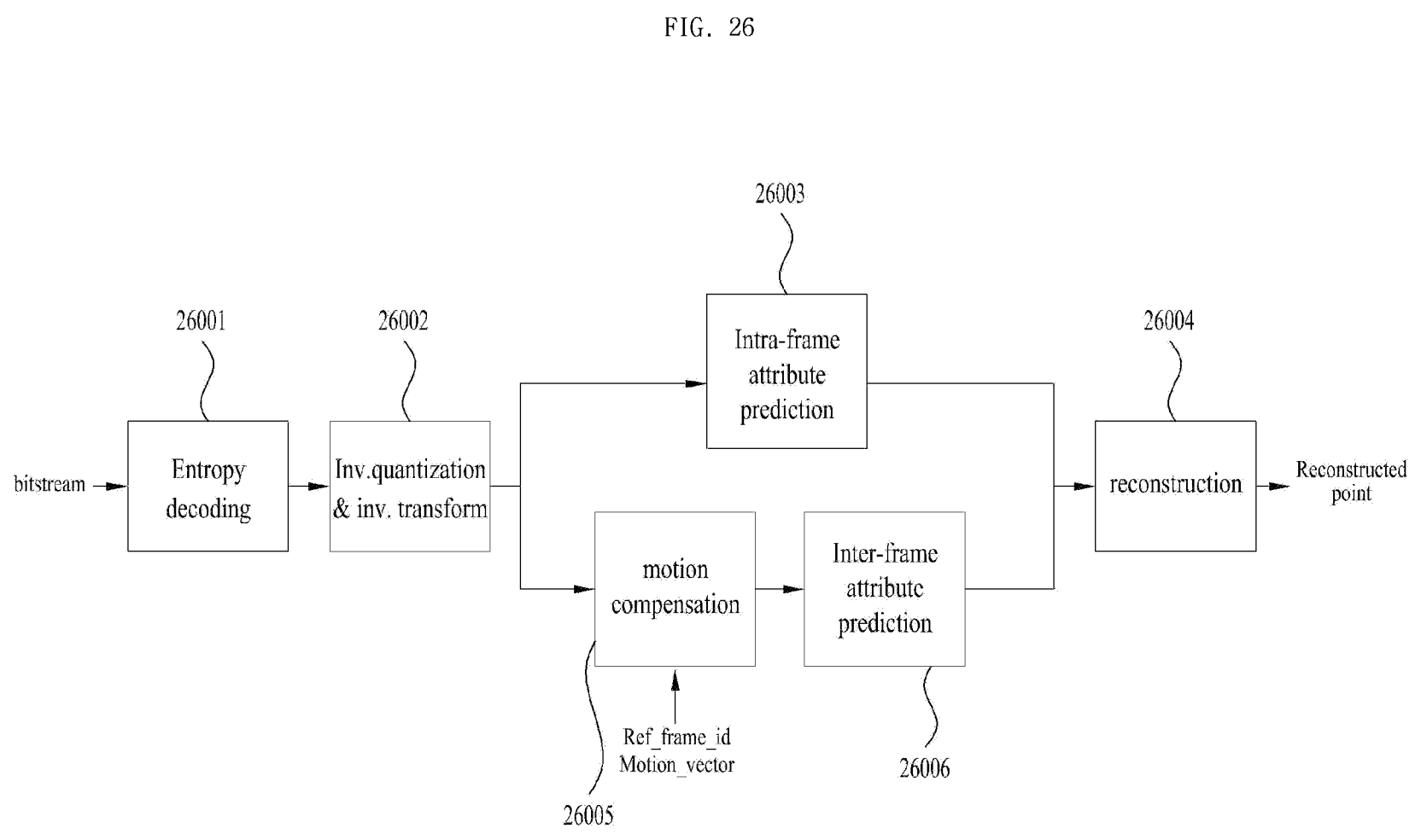

In addition, the above-described point cloud data according to the embodiments may be performed by a point cloud data receiving device according to the embodiments (the point cloud video decoder 10006 of FIG. 1, the receiving device of FIGS. 10, 11, and 13, the XR device 1430 of FIG. 14, the receiving device of FIG. 26, and/or hardware including one or more processors or integrated circuits configured to communicate with one or more memories, software, firmware, or a combination thereof).

Figure 20:
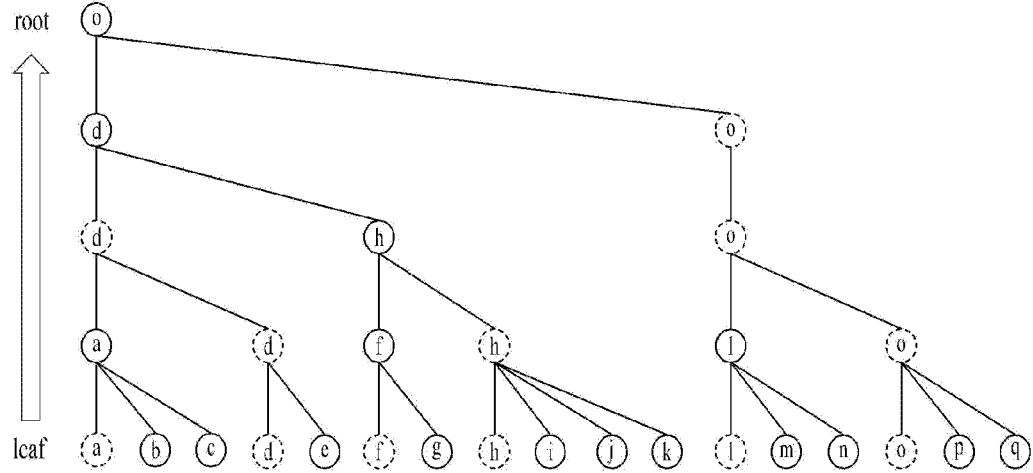
FIG. 20 shows that a parent node attribute of a higher depth is defined based on a child node attribute in an octree structure according to embodiments.

FIG. 20 shows that a parent node attribute of a higher depth is defined based on a child node attribute in an octree structure according to embodiments.

Attribute matching of an octree node according to the embodiments may be performed by the encoder/encoding operation or decoder/decoding operation, and the transmitting and receiving device/method described with reference to FIGS. 1, 2, 4, 10, 11, 12, 13, and 25 to 28.

In a first process of attribute compression based on inter-frame correlation, attribute is matched to each node created in an octree structure for a point cloud of the current frame. A scheme used in scalable attribute coding may be applied thereto. Each point of point cloud data may be matched one-to-one with a leaf node of the octree structure, and parent node attribute of a higher depth may be defined based on a child node attribute. For example, in the case of FIG. 20, the attribute of a first child for children arranged in the order of Morton code may be designated as the attribute of the parent. For a depth of one level higher, the attribute of the last child is designated as the attribute of the parent, and this sampling process may be alternately performed until reaching the root. In FIG. 20, a solid line circle means a point/node defined in each octree depth, and a dotted line circle indicates a case of sampling with attribute of a higher node.

Matching of node information (geometry information or attribute information) of an octree structure according to the embodiments may specify information of a parent node via sampling based on information of a child node based on intra-frame correlation. (intra)

When inter-frame correlation is not used, that is, when compression is performed based only on intra-frame correlation, prediction residuals are delivered at each octree depth level. That is, in FIG. 20, o/d-o/h-d/a-d, f-h, l-o/b-a, c-a, e-d, g-f, i-h, j-h, k-h, m-l, n-l, p-o, and q-o are transferred as residuals according to each level. At this time, the root has a large prediction error because the attribute value is used without changes, and when correlation of parent-child attributes is low, prediction error increases and compression efficiency may decrease.

Referring to FIG. 20, any one attribute among attributes of lower nodes may be designated as an attribute of a parent node. For example, the parent node of leaf nodes respectively having attributes a, b, and c may be designated as attribute a, which is one of the attributes of leaf nodes. In addition, the parent node of child nodes respectively having attributes a and d may be designated as attribute d, which is one of the attributes of child nodes. That is, attribute information of a parent node may be specified via sampling among attribute information of child nodes. Attribute information designation for parent nodes may be performed from the leaf node to the root node.

A point cloud data transmitting and receiving method/device according to the embodiments may propose a method of predicting an attribute of a prediction unit block of a current frame as an attribute of a predicted block present in a reference frame based on inter-frame motion prediction.

Figure 21:
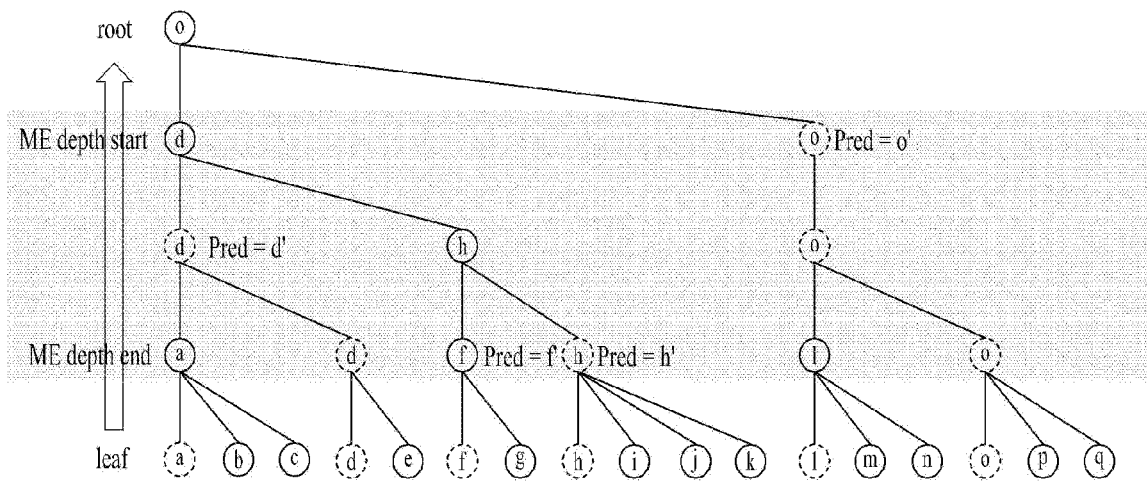
FIG. 21 shows an example of prediction of an attribute based on motion estimation for a specific octree depth range in an octree structure according to embodiments.

FIG. 21 shows an example of prediction of an attribute based on motion estimation for a specific octree depth range in an octree structure according to embodiments.

FIG. 21 shows that each attribute predicted value is matched to each node according to motion estimation and motion compensation for an octree structure to which attribute information is matched. At this time, among nodes belonging to the range of ME depth start-end, inter-frame attribute prediction may be matched to a node to which a motion vector is transmitted or a node, a split flag of which is 0, and a predicted attribute value may be designated as one representative attribute (or average, median value, first, last, average for a part, and the like) based on points within a motion-compensated predicted block. In FIG. 21, predicted attribute values are expressed as o', d', f', and h'.

Prediction of an attribute value of an octree node according to the embodiments may be performed by the encoder/encoding operation or decoder/decoding operation, and transmitting and receiving device/method described with reference to FIGS. 1, 2, 4, 10, 11, 12, 13, and 25 to 28.

After a predicted attribute value is obtained from the reference frame, a residual for each node is generated as follows.

1. depth start . . . depth end −1
When a motion vector is present (split flag=0), residual=node attribute−predicted attribute
In the other case, skip
2. For depth end . . . leaf,
When a motion vector is present (split flag=0), residual=node attribute−predicted attribute
In the other case, residual=child−parent
At this time, unlike the existing scalable attribute coding, a residual is generated from ME depth start rather than being generated from the root. The resulting residual is as follows. An underlined part in the following shows the case of using inter-frame prediction. The following shows an example of generating residual based on inter-frame prediction.
ME start depth: o-o', d-d'
ME end depth: a-d, f-f', h-h', l-o
Leaf: b-a, c-a, e-d, g-f, i-h, j-h, k-h, m-l, n-l, p-o, q-o
In an embodiment, a method of using an attribute of a predictor as a representative attribute value has been described, but a method of defining a predictor for all leaf nodes or matching points in a predictor at a parent node level may be applied depending on a compression method. In addition, in transmitting residual, a difference or average value between the residual of intra-prediction and the residual of inter-prediction may be delivered.

For the embodiments, when there are a motion vector (MV), a split flag (split_flag), and a pop flag (population-_flag), a point cloud data receiving device according to the embodiments may perform reconstruction of point cloud data as follows.

1. depthStart

A. A parent node is not reconstructed for node o, split-_flag=0, and o' is predicted based on a motion vector, o=o'+res 2. depthStart+1

A. A parent node is not reconstructed for node d, split-_flag=0, and d' is predicted based on a motion vector, d=d'+res B. A parent node is reconstructed for node o and is a sampling position (dotted line), and thus an attribute of a parent is inherited.

3. depthEnd

A. A parent node is for node a, and thus a=d+res based on inter-frame prediction B. A parent node is reconstructed for node d and is a sampling position (dotted line), and thus an attribute of a parent is inherited.

C. A parent node is not reconstructed for node f, split-_flag=0, and f' is predicted based on a motion vector, f=f'+res D. A parent node is not reconstructed for node h, split-_flag=0, and h' is predicted based on a motion vector, h=h'+res E. A parent node is reconstructed for node i, and thus i=o+res based on inter-frame prediction F. A parent node is reconstructed for node o and is a sampling position (dotted line), and thus an attribute of a parent is inherited.

All nodes are reconstructed in depthEnd, and thus attribute reconstruction is performed for subsequent nodes by intra-prediction.

The point cloud data transmitting and receiving device/ method according to the embodiments may transmit and receive residuals smaller than a difference between the parent node and the child node by predicting attribute information as described above. Therefore, an efficiency of encoding/decoding and transmission/reception according to small residual value transmission is increased.

The point cloud data transmitting and receiving device/ method according to the embodiments predicts motion estimation-based attribute information in a specific range (ME depth start and ME depth end) for an octree structure to which attribute information is designated as shown in FIG. 20. Referring to FIG. 21, predicted attribute information d' is predicted based on motion estimation for attribute information d, predicted attribute information f' is predicted based on motion estimation for attribute information f, and predicted attribute information h' is predicted based on motion estimation for attribute information h. In addition, predicted attribute information o' is predicted based on motion estimation for attribute information o.

In the case in which residual information for an octree node ranges from ME depth start to ME depth end −1, when a motion vector exists (split flag=0), residual is a difference between a node attribute and a predicted attribute. When there is no motion vector, the residual may be skipped.

In the case of the range of a leaf node at an ME depth end, when a motion vector exists (split flag=0), the residual is a difference between the node attribute and the predicted attribute. In the other case, the residual is a difference between an attribute of a child node and an attribute of a parent node.

The point cloud data transmitting and receiving device/ method according to the embodiments transmits and receives residuals (d-d', f-f', h-h', and o-o') of predicted attribute information and original attribute information, thereby reducing transmitted residual information and increasing coding efficiency.

Figure 22:
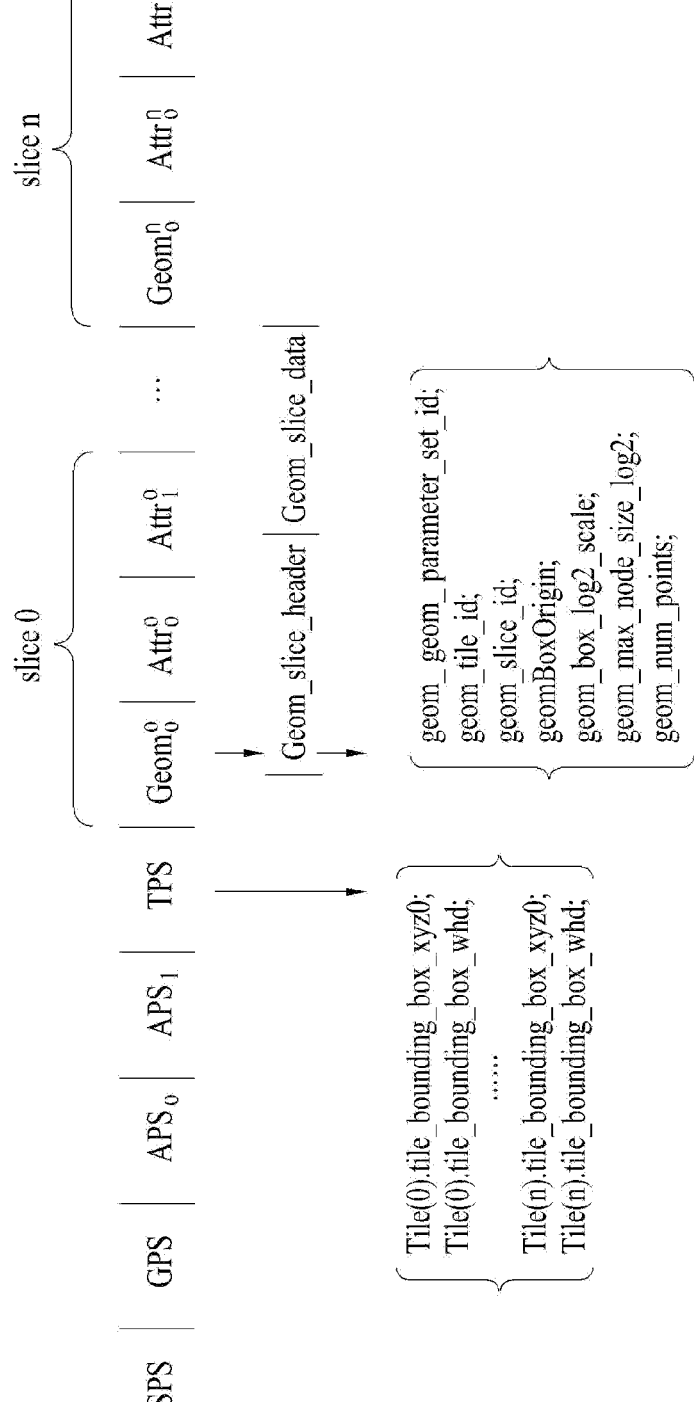
FIG. 22 shows an example of encoded point cloud data according to embodiments.

FIG. 22 shows an example of encoded point cloud data according to embodiments.

Information related to inter-prediction for coding attributes according to the embodiments may be defined in a parameter set, a data unit header, or a data unit according to an application unit, and may be defined in a corresponding or separate location depending on an application or a system, and thus an application range, an application method, and the like may be differently used for the information.

Although the embodiments have described that information is defined in a data unit, the information may be defined in a parameter set or a data unit header or the information may be defined in an attribute parameter set and an attribute slice header and may be defined in a sequence parameter set, a tile parameter set, and the like to link with an attribute coding method or to be applied to attribute coding. In addition, when a defined syntax element is to be applied to a plurality of point cloud data streams as well as the current point cloud data stream, the information may be delivered through a parameter set of a higher concept.

Signaling information according to the embodiments may be generated in a compression (encoding) process of a (scalable) point cloud compression transmitting device/ method and used in a decoding process of a (scalable) point cloud compression receiving device/method.

Hereinafter, a parameter according to the embodiments (which may be variously called metadata, signaling information, and the like) may be generated in a process of a transmitting device according to the embodiments, transmitted to a receiving device according to the embodiments, and used for a data reconfiguration process of point cloud data. For example, parameters according to the embodiments may be generated in a metadata processor (or metadata generator) of a transmitting device according to the embodiments, and obtained in a metadata parser of a receiving device according to the embodiments.)

Compression through a reference relationship between slices may be applied to refer to nodes in other slices for not only a start node of a slice but also an arbitrary node. In addition, the compression may be extended and applied to a reference relationship between trees.

The abbreviations shown in FIG. 22 mean the following.

SPS: Sequence Parameter Set

GPS: Geometry Parameter Set

APS: Attribute Parameter Set

TPS: Tile Parameter Set

Geom: Geometry bitstream=geometry slice header+geometry slice data

Attr: Attribute bitstream=attribute slice header+attribute slice data

A point cloud data encoder, transmission device, and the like according to the embodiments may generate signaling information about operations according to the embodiments, and generate and transmit a bitstream including the above point cloud data.

A point cloud data decoder, a receiving device, and the like according to the embodiments may receive a bitstream and reconstruct point cloud data based on parameter(s) included in the bitstream.

FIG. 23 shows an example of a data unit header syntax according to embodiments.

FIG. 23 shows a slice header included in the bitstream of FIG. 22.

FIG. 24 shows an example of a data unit syntax according to embodiments.

FIG. 24 shows a slice included in the bitstream of FIG. 22.

The data unit header syntax and the data unit syntax may match a geometry bitstream (Geom) or an attribute bitstream (Attr) of FIG. 22. A slice of FIG. 22 may correspond to a data unit. Also, a slice header of FIG. 22 may correspond to a data unit header.

A reference frameID (ref_frame_id) may represent an index of a reference frame used in prediction of a prediction unit (PU).

Mv_depth_start and mv_depth_end may represent start and end of an octree depth at which a motion vector is to be delivered.

When Split_flag is 1, this may represent that a motion vector for a corresponding node is delivered after a child node is split. In the case of 0, the motion vector for the corresponding node may be delivered.

In the case of Population_flag 1, this may represent whether a non-split node is occupied.

A motion vector (Motion_vector) may represent a motion vector for each axis.

Residual may represent a prediction residual for each axis.

Parameters (metadata, signaling information, and the like) according to the embodiments may be generated during a process of a transmitting and receiving device/method according to the embodiments, transmitted to a receiving device according to the embodiments, and used to reconstruct point cloud data. For example, parameters according to the embodiments may be generated by a metadata processor (or metadata generator) of a transmitting device according to the embodiments, and acquired by a metadata parser of a receiving device according to the embodiments.

FIG. 25 shows an example of a point cloud data transmitting device/method according to embodiments. The configuration or operations shown in FIG. 25 may be performed by a point cloud data transmitting device/method (e.g., the transmitting device of FIG. 1, the encoding of FIG. 2, the encoder of FIG. 4, the transmitting device of FIG. 12, and the transmitting method of FIG. 27) according to the embodiments or a combination thereof. The components of the point cloud data transmitting and receiving device/method according to the embodiments may be configured/performed by hardware, software, processor, and/or a combination thereof.

The point cloud data transmitting device/method shown in FIG. 25 relates to attribute information compression through motion estimation-based attribute information prediction. The motion estimation-based compression method may also be applied to compression of geometry information and compression of other information.

FIG. 25 shows an example of motion estimation-based attribute compression according to inter-frame correlation. Attribute information is matched to an octree node based on an octree structure for the input point cloud data (attr matching to octree nodes). In this case, a scalable LoD generation method may be used. In addition, attribute prediction may be performed based on a relationship between octree levels (Intra-frame attribute prediction). Alternatively, motion-based attribute prediction may be performed for a node having a motion vector based on motion estimation according to the embodiments (inter-frame attribute prediction). In this case, motion estimation and motion compensation may be separately applied in attribute compression, or an estimated motion vector may be used in position compression. In the former case, the motion vector is separately transmitted for the attribute, but in the latter case, the transmitted motion vector information, split, and population information for position compression are reused, and thus a bit rate may be lowered. Attribute information may be compressed by obtaining a difference from an original attribute information for the predicted attribute information and performing transform, quantization, and entropy coding.

In FIG. 25, motion estimation-based attribute prediction may be performed based on the description given with reference to FIGS. 15 to 24. That is, a motion vector may be calculated in consideration of a difference in attribute information as well as a difference in geometry information between the current frame and the reference frame. Attribute information of the prediction point may be predicted as a representative attribute of the predicted block B' of the reference frame. In FIG. 25, an operation of predicting attribute information based on a relationship between octree levels from matching attribute information to an octree node may be performed based on the method described in FIGS. 18 to 21.

A point cloud data transmitting device according to the embodiments described with reference to FIG. 25 may include an attribute matcher (attr matcher to octree nodes) 25001, an intra-frame attribute predictor 25002, a prediction error estimator 25003, a transformer 25004, a quantizator 25005, an entropy coder 25006, a motion estimator 25007, a motion compensator 25008, and/or an inter-frame attribute predictor 25009.

The attribute matcher 25001 may match attribute information to nodes of an octree structure. The attribute matcher 25001 may sample attribute information of a lower node of the octree structure and designate the attribute information as attribute information of a parent node. That is, the attribute matcher 25001 may designate attribute information of a higher node based on attribute information of the lower node. Matching of an octree node and attribute information according to the embodiments is described in FIG. 20.

The intra-frame attribute predictor 25002 may predict attribute information of points included in a prediction unit with reference to attribute information of points in the same frame. Intra frame attribute prediction according to embodiment may be performed based on attribute information of a higher node and a lower node of an octree structure. For example, attribute information of a higher node may be predicted based on attribute information of any one of lower nodes, or attribute information of a lower node may be predicted based on attribute information of a higher node.

The motion estimator 25007 may calculate a motion vector based on a reference frame to predict a point of a current frame. The motion estimator 25007 may calculate a predictor candidate P that has the smallest difference from a prediction unit (PU) of the current frame among a plurality of predictor candidates in a search window within a reference frame. In this case, the difference may be calculated by a function based on geometry information and attribute information of points within the prediction unit. As for the motion vector according to the embodiments, an optimal motion vector may be calculated in consideration of a difference between the prediction unit block of the current frame and the predictor candidate of the reference frame, an error that occurs when the motion vector is used, and use of additional bits. Motion vector calculation according to the embodiments is described in FIG. 15.

The motion compensator 25008 may calculate a predicted value for predicting a point of the current frame from a point of the reference frame based on the calculated motion vector. Based on the geometry information and motion vector of the point of the reference frame, the geometry information of the point within the prediction unit of the current frame may be predicted, and the attribute information of the point within the prediction unit of the current frame may be predicted based on the attribute information of the point of the reference frame. Motion compensation according to the embodiments is described in FIG. 19.

The inter-frame attribute predictor 25009 predicts attribute information of a point of a current frame from attribute information of a point of a reference frame based on motion estimation and motion compensation. For example, attribute information of an octree node of the current frame may be predicted from attribute information of points belonging to a predictor of the reference frame. A predictor of the reference frame may be calculated based on a motion vector, and the attribute information of the octree node of the current frame may be predicted by an average value and median value of the attribute information of points belonging to the predictor, or a combination of the average value of the attribute information of some points. Attribute prediction according to the embodiments is described in FIG. 19. The prediction error estimator 25003 generates a residual, which is an error between prediction information and original information. The residual according to the embodiments includes a difference between higher node information (position or attribute) and lower node information in an octree structure and a difference between prediction information predicted based on motion estimation and original information. Residuals according to the embodiments are described in FIGS. 20 to 21.

The transformer 25004 may transform the residual, and the quantizator 25005 may quantize the transformed residual value. The entropy coder 25006 may entropy-encode the transformed and quantized residual value.

FIG. 26 shows an example of a point cloud data receiving device/method according to embodiments. Operations shown in FIG. 26 may be configured/performed by a point cloud data receiving device/method according to the embodiments (e.g., the receiving device of FIG. 1, the decoding of FIG. 2, the decoder of FIG. 11, the receiving device of FIG. 13, and the receiving method of FIG. 28) or a combination thereof. Components of the point cloud data transmitting and receiving device/method according to the embodiments may be performed by hardware, software, a processor, and/or a combination thereof.

The point cloud data receiving device/method shown in FIG. 26 relates to reconstruction of attribute information through motion estimation-based attribute prediction. The motion estimation-based reconstruction method may also be applied to reconstruction of geometry information and reconstruction of other information. In addition, the point cloud data receiving method of FIG. 26 may correspond to a reverse process of the data processing process performed in the point cloud data transmission method of FIG. 25.

In FIG. 26, motion estimation-based attribute prediction may be performed based on the content described in FIGS. 15 to 24. That is, a motion vector may be calculated in consideration of a difference in attribute information as well as a difference in geometry information between the current frame and the reference frame. Attribute information of a prediction point may be predicted as a representative attribute of the predicted block B' of the reference frame.

FIG. 26 shows an embodiment of an operation of an attribute decoder in consideration of inter-prediction. When a motion vector applied to position compression and related information are used in attribute compression, inter-frame attribute prediction may be performed based on split and population information (inter-frame attribute prediction). In the case of a node to which the motion vector is not delivered, prediction may be performed based on similar information in a frame (intra-frame attribute prediction).

The point cloud data receiving device according to the embodiments described in FIG. 26 may include an entropy decoder 26001, an inv.quantizator&inv.transformer 26002, an intra-frame attribute predictor 26003, a reconstructor 26004, a motion compensator 26005, and/or an inter-frame attribute predictor 26006.

The entropy decoder 26001 may decode a bitstream. The inv.quantizator&inv.transformer 26002 may inversely quantize and inversely transform the decoded point cloud data.

The intra-frame attribute predictor 26003 may predict attribute information of points included in the prediction unit with reference to attribute information of points within the same frame. Intra frame attribute prediction according to the embodiments may be performed based on attribute information of a higher node and a lower node of an octree structure. For example, attribute information of a higher node may be predicted based on attribute information of any one of lower nodes, or attribute information of a lower node may be predicted based on attribute information of a higher node.

The motion compensator 26005 may calculate a predicted value for predicting the point of the current frame from the point of the reference frame based on the calculated motion vector. Based on the geometry information and motion vector of the point of the reference frame, the geometry information of the point within the prediction unit of the current frame may be predicted, and the attribute information of the point within the prediction unit of the current frame may be predicted based on the attribute information of the point of the reference frame. Motion compensation according to the embodiments is described in FIG. 19.

The inter-frame attribute predictor 26006 predicts attribute information of a point of a current frame from attribute information of a point of a reference frame based on motion estimation and motion compensation. For example, attribute information of an octree node of the current frame may be predicted from attribute information of a point belonging to a predictor of a reference frame. The predictor of the reference frame may be calculated based on the motion vector, and the attribute information of the octree node of the current frame may be predicted by an average value and median value of the attribute information of the points belonging to the predictor, or a combination of an average value of the attribute information of some points. Attribute prediction according to the embodiments is described in FIG. 19.

The reconstructor 26004 reconstructs the original information by adding the predicted information and the residual value. That is, a reconstructed point may be generated.

Figure 27:
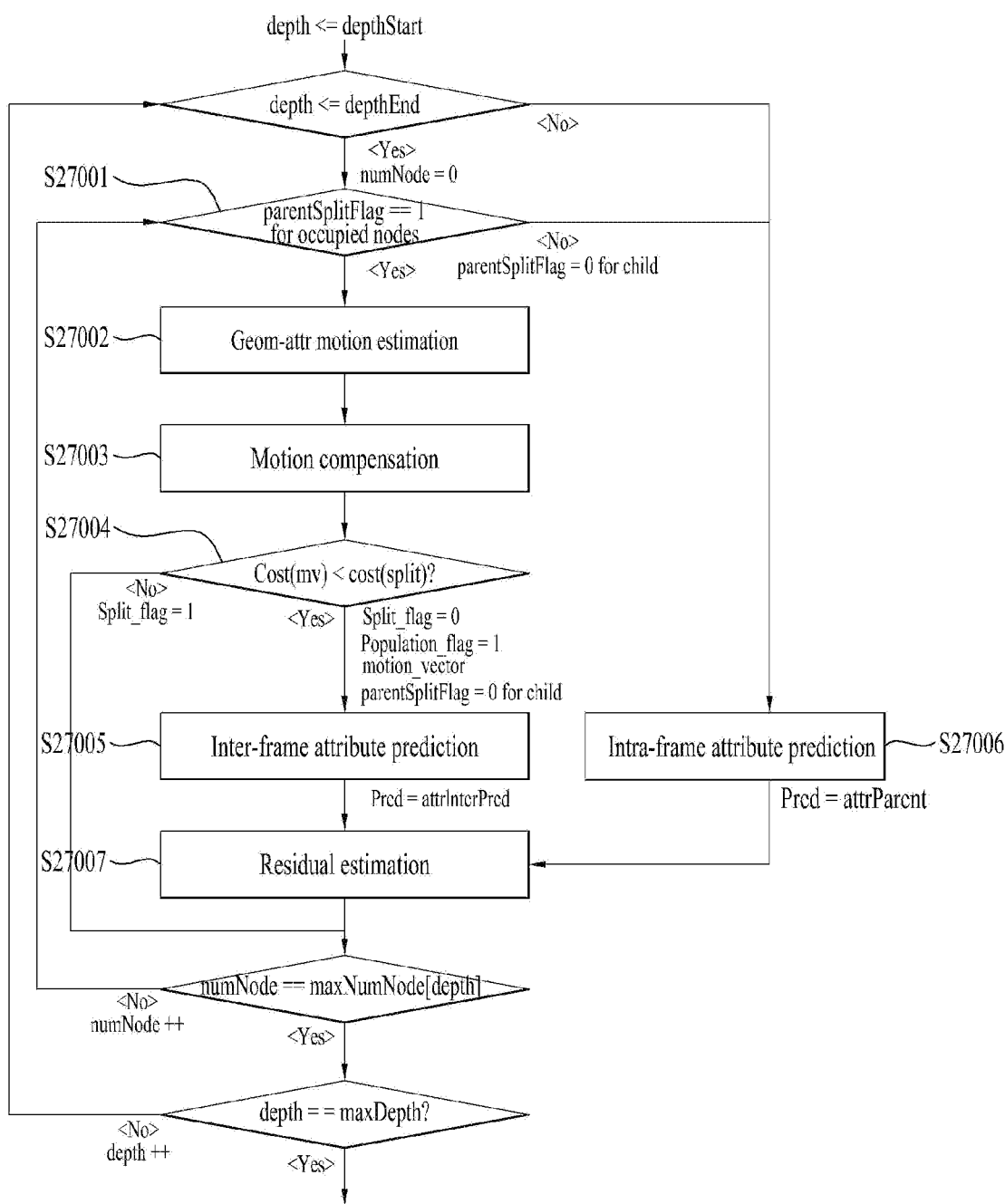
FIG. 27 shows a flowchart of an operation of a point cloud data transmitting device/method according to embodiments.

FIG. 27 shows a flowchart of an operation of a point cloud data transmitting method according to embodiments. The operation shown in FIG. 27 may be performed by the point cloud data transmitting device according to the embodiments (e.g., the transmitting device of FIG. 1, the encoding of FIG. 2, the encoder of FIG. 4, the transmitting device of FIG. 12, and the transmitting device of FIG. 25) or a combination thereof. Components of the point cloud data transmitting and receiving device according to the embodiments may be configured by hardware, software, a processor, and/or a combination thereof.

FIG. 27 shows an inter-frame correlation-based attribute compression method. When attribute information is matched with an octree node, motion prediction and motion compensation are performed in a depth range (depthStart and depthEnd) in which motion vector-based prediction is performed. A process of performing motion prediction and motion compensation according to the embodiments is described in FIGS. 15 to 19.

At this time, whether to perform motion prediction based on an internal parameter called parentSplitFlag indicating whether the parent node is split is determined, and for all nodes belonging to depthStart, parentSplitFlag=1 is assumed and prediction is performed from depthStart. For an occupied node (population_flag=1), when parentSplit-Flag is 1, motion estimation (or prediction) according to the embodiments is performed, and a predictor similar to the current node (or predictor) is obtained from a reference frame. During motion estimation, a motion vector may be calculated in consideration of a difference between geometry information and attribute information between the current frame and the reference frame, as shown in FIGS. 15 to 19.

Then, a cost (cost(mv)) calculated from a cost function when a motion vector is delivered and a cost(cost(split)) calculated from the cost function when split is performed are compared with each other, and when the cost is smaller when the motion vector is delivered, split is not performed, inter-frame attribute prediction is performed based on a predictor when the motion vector is used, and parentSplit-Flag is designated to 0 for a child node. In other hand, split is performed, and thus split_flag=1 is defined and compression is not performed. Motion estimation uses the generated result when geometry information is coded, and thus the number of bits required to transmit the motion vector may be reduced. On the other hand, when a separate motion vector for attribute coding is delivered, a more accurate motion vector may be delivered to the attribute.

Referring to FIG. 27, a point cloud data transmitting method according to embodiments may perform the following operations.

The following operations may be performed in the range of depth start-depth end of an octree structure after attribute information is matched to an octree node.

S27001 is an operation of checking internal parameter parentSplitFlag information indicating whether a parent node is split for an occupied node.

S27002 is an operation of performing motion estimation for attribute information and geometry information when a parent node is split with respect to an occupied node (parentSplitFlag=1). S27002 may be performed in the motion estimator 25007 of FIG. 25.

S27003 is an operation of performing motion compensation based on a calculated motion vector. S27003 may be performed in the motion compensator 25008 of FIG.

S27004 is an operation of comparing a cost (cost(mv)) calculated from a cost function when a motion vector is transmitted with a cost (cost(split)) calculated from the cost function when split is performed without transmission of the motion vector.

S27005 is an operation of specifying parentSplitFlag=0 of a child node and performing inter-frame attribute prediction for a corresponding node when the cost in the case of transmission of the motion vector is smaller in operation, split flag=0, population flag=1. S27005 may be performed in the inter-frame attribute predictor 25009 of FIG. 25.

S27006 is an operation of performing intra-frame attribute prediction when the parent node is not split (parentSplit-Flag=0). S27006 may be performed in the intra-frame attribute predictor 25002 of FIG. 25.

S27007 is an operation of estimating residuals of attribute information (attrInterPred and attrParent) predicted by inter-frame attribute prediction or intra-frame attribute prediction and original information. S27007 may be performed in the prediction error estimator 25003 of FIG. 25.

The above-described operations may be performed while traversing all nodes in a specific depth range of the octree structure.

Figure 28:
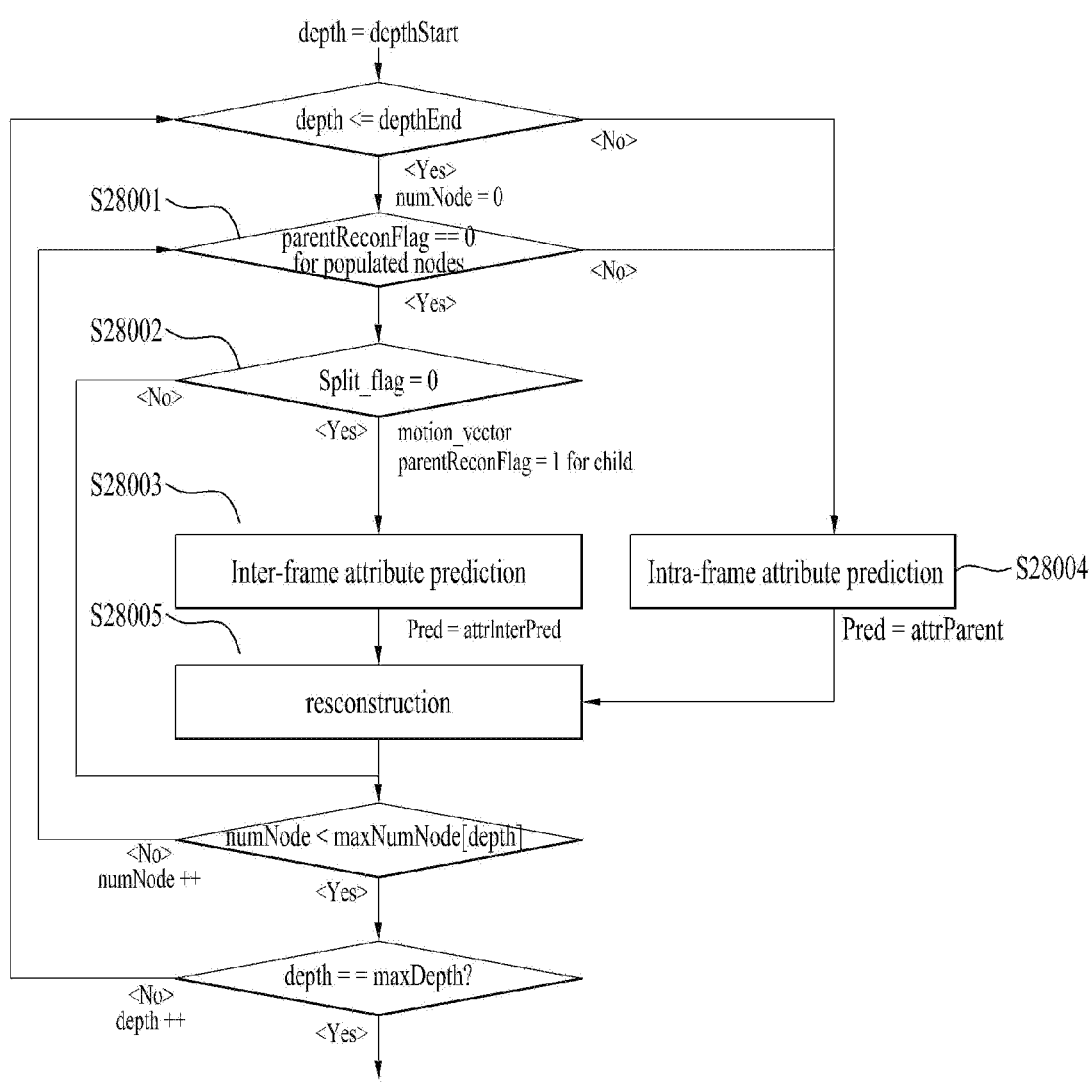
FIG. 28 is a flowchart of an example of operations of a point cloud data receiving device/method according to embodiments.

FIG. 28 is a flowchart of an example of operations of a point cloud data receiving method according to the embodiments.

The operations shown in FIG. 28 may be performed by the point cloud data receiving device/method according to the embodiments (e.g., the receiving device of FIG. 1, the decoding of FIG. 2, the decoder of FIG. 11, the receiving device of FIG. 13, and the receiving device of FIG. 26) or a combination thereof. Components of the point cloud data transmitting and receiving device according to the embodiments may be configured by hardware, software, a processor, and/or a combination thereof. The operations described in FIG. 28 may correspond to a reverse process of the data processing process performed in the point cloud data transmitting device/method of FIG. 27.

Referring to FIG. 28, the receiving device according to the embodiments may receive a separate motion vector or store motion vector information generated in a geometry information coding (geometry decoding) process and use the information to decode attribute. The receiving device according to the embodiments may indicate whether a parent node is decoded using an internal parameter called ParentReconFlag. That is, when ParentReconFlag is 1, the attribute may be reconstructed using the predicted attribute value in a frame. When ParentReconFlag is 0, a motion vector may exist for the current node, and thus split_flag of the transmitted signal may be checked and decoding may be determined. When Split_flag is 1, additional splitting is performed, and thus the motion vector and residual may not be transmitted. When split_flag is 0, attribute prediction may be performed through a motion compensated predictor within a frame designated by reference frameID (reference-_frame_id) (inter-frame attribute prediction). For the motion vector, split_flag, population_flag, and the like, a directly signaled value may be used, or a value calculated in the process of geometry decoding may be used. Then, the attribute at each node may be decoded using the predicted value and the residual.

Referring to FIG. 28, the point cloud data receiving method according to embodiment may perform the following operations.

The following operation may be performed in the range of depth start-depth end of an octree structure.

S28001 is an operation of checking internal parameter parentReconFlag information indicating whether a parent node is reconstructed for an occupied node.

S28002 is an operation of checking whether Split_flag=0 when a parent node is not reconstructed for an occupied node (parentReconFlag=0). When Split_flag=0, parentReconFlag=1 is specified for a child node.

S28003 is an operation of performing inter-frame attribute prediction based on a motor vector when Split_flag=0. S28003 may be performed by the inter-frame attribute predictor 26006 of FIG. 26. A point predicted value (Pred) of the current frame may be a predicted value (attInterPred) according to inter-frame attribute prediction.

S28004 is an operation of performing intra frame attribute prediction when internal parameter parentReconFlag information indicating whether a parent node is reconstructed for an occupied is 1. S28004 may be performed by the intra-frame attribute predictor 26003 of FIG. 26. The point predicted value (Pred) of the current frame is a predicted value (attParent) according to intra frame attribute prediction. For example, attribute information of a child node may be predicted as attribute information of a parent node.

S28005 is an operation of reconstructing original information by summing residual and attribute information (attrInterPred and attrParent) predicted by inter-frame attribute prediction or intra-frame attribute prediction. S28005 may be performed by the reconstructor 26004 of FIG. 26.

The above-described operations may be performed while traversing all nodes in a specific depth range of the octree structure.

Figure 29:
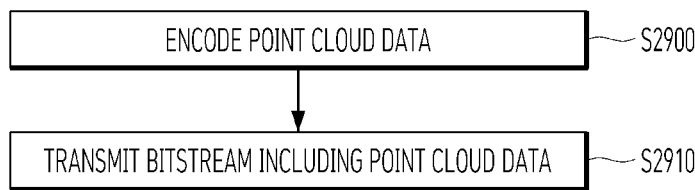
FIG. 29 shows an example of a point cloud data transmitting method according to embodiments.

FIG. 29 shows a point cloud data transmitting method according to embodiments. The transmitting method according to the embodiments may include encoding point cloud data (S2900) and transmitting a bitstream including the point cloud data (S2910).

The encoding the point cloud data (S2900) may be an operation of encoding the point cloud data by the point cloud video encoder 10002 of FIG. 1, the encoding 20001 of FIG. 2, the encoder of FIG. 4, the transmitting device of FIG. 12, the XR device 1430 of FIG. 14, the transmitting device of FIG. 26, hardware including one or more processors or integrated circuits configured to communicate with one or more memories, software, firmware, or a combination thereof.

In detail, the encoding the point cloud data (S2900) may include encoding geometry information of the point cloud data and encoding attribute information of the point cloud data.

The transmitting a bitstream including the point cloud data (S2910) may be a transmitting operation like the transmitting the point cloud data of FIG. 2 performed by the transmitter 10003 of FIG. 1, the transmission processor 12012 of FIG. 12, the XR device 1430 of FIG. 14, the transmitting device of FIG. 25, and/or hardware including one or more processors or integrated circuits configured to communicate with one or more memories, software, firmware, or a combination thereof.

In more detail, the transmitting method according to the embodiments may include encoding the point cloud data included in the frame and transmitting a bitstream including the point cloud data, and the encoding the point cloud data may include encoding geometry information of the point cloud data and encoding attribute information of the point cloud data.

Here, the encoding the point cloud data included in the frame may include predicting point cloud data of a current frame based on point cloud data included in a reference frame. As described with reference to FIGS. 15 to 25, a motion vector may be calculated based on a difference of geometry information and attribute information between a current frame (first frame) and a reference frame (second frame), and geometry information and attribute information of points belonging to the current frame may be predicted from the reference frame by motion compensation using the calculated motion vector. Thus, the predicting the point cloud data of the current frame may include generating a motion vector.

In the point cloud data transmitting method according to the embodiments, when the current frame is predicted based on the motion vector, points of an octree node may be predicted within a specific depth range of the octree structure. The operation of predicting the points of the octree node within the specific depth range of the octree structure is described with reference to FIGS. 18 and 21, and information on a specific depth range of the octree structure may be signaled.

The point cloud data transmitting method according to the embodiments may perform an operation of comparing a cost when an octree is split with a cost when points of an octree node are predicted and performing an operation corresponding to the lower cost during prediction for the current frame based on the motion vector. A description related to the operation has been described with reference to FIGS. 16 and 17, and FIG. 27 is a flowchart showing the operation of comparing the cost when the motion vector is transmitted and the cost when the node is split. That is, the point cloud data transmitting method according to the embodiments may include comparing the cost when the octree node is split with the cost when points of the octree node are predicted based on the motion vector, and point information prediction of the octree node is performed in response to the comparison result.

The point cloud data transmitting method according to the embodiments may include including information indicating whether to split an octree node and identifier information for a reference frame in a bitstream and transmitting the bitstream.

The above-described point cloud data transmitting method according to the embodiments may be performed by the point cloud data transmitting device according to the embodiments (e.g., the point cloud video encoder 10002 of FIG. 1, the encoding 20001 of FIG. 2, the encoder of FIG. 4, the transmitting device of FIG. 12, the XR device 1430 of FIG. 14, the transmitting device of FIG. 25, hardware including one or more processors or integrated circuits configured to communicate with one or more memories, software, firmware, or a combination thereof).

Figure 30:
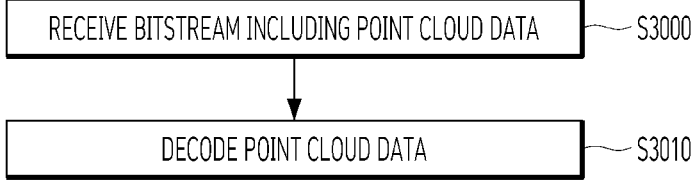
FIG. 30 shows an example of a point cloud data receiving method according to embodiments.

FIG. 30 shows an example of a point cloud data receiving method according to embodiments. The receiving method according to the embodiments may include receiving a bitstream including point cloud data (S3000) and decoding the point cloud data (S3010).

The receiving the bitstream including the point cloud data (S3000) may include receiving the point cloud data by the reception device 10004 of FIG. 1, the receiving device of FIGS. 10 and 11, the receiver 13000 of FIG. 13, the XR device 1430 of FIG. 14, the receiving device of FIG. 26, and/or hardware including one or more processors or integrated circuits configured to communicate with one or more memories, software, firmware, or a combination thereof.

The decoding the point cloud data (S3010) may include decoding the point cloud data by the point cloud video decoder 10006 of FIG. 1, the receiving device of FIGS. 10, 11, and 13, the XR device 1430 of FIG. 14, the receiving device of FIG. 26, and/or hardware including one or more processors or integrated circuits configured to communicate with one or more memories, software, firmware, or a combination thereof.

The decoding the point cloud data may include decoding geometry information of the point cloud data and decoding attribute information of the point cloud data.

In more detail, the point cloud data receiving method according to the embodiments may include receiving a bitstream including point cloud data belonging to a frame and decoding the point cloud data, and the decoding the point cloud data may include decoding geometry information of the point cloud data and decoding attribute information of the point cloud data.

Here, the decoding the point cloud data include predicting point cloud data of a current frame (first frame) based on point cloud data included in a reference frame (second frame). That is, as described in FIGS. 15 to 25, a motion vector may be calculated based on a different of geometry information and attribute information between the current frame and the reference frame, and geometry information and attribute information of points belonging to the current frame may be predicted from the reference frame by motion compensation using the calculated motion vector. Thus, the predicting the point cloud data of the current frame may include generating the motion vector.

In the receiving method according to the embodiments, the received bitstream may include motion vector information, and point cloud data of a current frame from a reference frame may be predicted based on the received motion vector.

In the predicting the point cloud data of the current frame in the receiving method according to the embodiments, points of an octree node may be predicted based on a motion vector in a specific depth range of the octree structure. The operation of predicting the points of the octree node in the specific depth range of the octree structure is described in FIGS. 18 and 21, and information on a specific depth range of the octree structure may be included in a bitstream and may be signaled.

In the receiving method according to the embodiments, the bitstream may include information indicating whether to split an octree node, and the decoding the point cloud data may include predicting points of the octree node based on the motion vector in response to the information indicating whether to split the octree node. FIG. 28 is a flowchart showing an operation of checking information (split_flag) indicating whether split is performed. When Split_flag=0, the octree node is not split, and points of an octree node are predicted based on a motion vector (inter-frame prediction). That is, in the receiving method according to the embodiments, the points of the octree node may be predicted in response to the information indicating whether split is performed.

To efficiently compress data included in the current frame, the point cloud data transmitting and receiving method/device according to the embodiments may refer to points included in a reference frame (a first frame, a second frame, a previous frame, a next frame, a subsequent frame, and the like). For example, point cloud data of the current frame may be predicted more accurately by generating a motion vector based on a difference in geometry information and a different in attribute information included in the reference frame and performing predictive coding. Therefore, a difference between the original point cloud data and the predicted point cloud data is small, and thus a residual transmission efficiency and a coding/decoding efficiency are increased. As a result, the point cloud data transmitting and receiving method/device may efficiently restore a 3D point cloud video or image, and may provide various services such as VR, AR, MR, and autonomous driving to a user.

The above-described point cloud data receiving method according to the embodiments may be performed by the point cloud data receiving apparatus according to the embodiments (the point cloud video decoder 10006 of FIG. 1, the receiving device of FIGS. 10, 11, and 13, the XR device 1430 of FIG. 14, and/or hardware including one or more processors or integrated circuits configured to communicate with one or more memories, software, firmware, or a combination thereof).

A compression method based on dependency between slices according to the present disclosure may be used in point cloud data compression. In particular, the method may be used in scalable lifting attribute compression and may be used in RAHT based on an octree structure.

The point cloud data transmitting and receiving device according to the embodiments finds a prediction block that satisfies the position and attribute reference by applying position and attribute-based motion prediction, and may use common motion information for position and attribute. At this time, position and attribute prediction may be performed with one motion vector, and thus the size of a bitstream may be reduced by transmitting the motion vector only on one side.

Therefore, the point cloud data transmitting device and encoder according to the embodiments may efficiently compress point cloud data by additionally considering intra-prediction as well as an inter-prediction mode. Similarly, the point cloud data receiving device and decoder according to the embodiments may receive a bitstream including point cloud data, and efficiently restore the point cloud data based on signaling information in the bitstream and/or a decoding operation according to embodiments.

The operation of the above-described point cloud compression transmitting and receiving method/device according to the embodiments may be described in combination with/reference to the process of the above point cloud compression device/method.

Also, operations according to embodiments described in the present disclosure may be performed by a transceiver including a memory and/or a processor according to the embodiments. The memory may store programs for processing/controlling operations according to the embodiments, and the processor may control various operations described in the present disclosure. The processor may be referred to as a controller or the like. Operations in the embodiments may be performed by firmware, software, and/or a combination thereof, and firmware, software, and/or a combination thereof may be stored in a processor or stored in a memory.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described with reference to the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same.

Executable instructions for performing the method/operations of the device according to the embodiments may be stored in a non-transitory CRM or other computer program products configured to be executed by one or more processors, or may be stored in a transitory CRM or other computer program products configured to be executed by one or more processors.

In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "I" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described with reference to this specification may be performed by a transmission/reception device including a memory and/or a processor according to embodiments. The memory may store programs for processing/controlling the operations according to the embodiments, and the processor may control various operations described with reference to this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

MODE

As described above, related contents have been described with reference to the best mode for carrying out the embodiments.

INDUSTRIAL APPLICABILITY

As described above, the embodiments may be fully or partially applied to the point cloud data transmission/reception device and system. It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A point cloud data encoding method comprising:
   encoding geometry data of point cloud data based on inter prediction,
   wherein the geometry data represents a position of a point;
   encoding attribute data of the point cloud data based on inter prediction;
   wherein the attribute data represents an attribute of the point,
   wherein the encoding of the geometry data includes:
   generating a reference frame for the inter prediction,
   wherein the geometry data is predicted by providing a geometry residual based on the reference frame,
   wherein the encoding of the attribute data includes:
   generating a reference frame for the inter prediction,
   wherein the attribute data is predicted based on the reference frame, wherein the attribute data is predicted based on a depth of an octree and wherein the attribute data is predicted based on information related to a motion vector.

2. The point cloud data encoding method of claim 1, further comprising:

predicting the point cloud data by comparing a cost for splitting an octree node with a cost for predicting points of the octree node based on the motion vector;

predicting the points of the octree node in response to a cost comparison result in the comparing.

3. The point cloud data encoding method of claim 2, wherein a bitstream including the geometry data and the attribute data includes information for whether the octree node is split and identifier information of the reference frame.

4. A point cloud data encoding device comprising:

a memory; and at least one processor connected to the memory, the at least one processor configured to:

encode geometry data of point cloud data based on inter prediction, wherein the geometry data represents a position of a point;

encode attribute data of the point cloud data based on inter prediction;

wherein the attribute data represents an attribute of the point, wherein the at least one processor is further configured to:

generate a reference frame for the inter prediction, wherein the geometry data is predicted by providing a geometry residual based on the reference frame, wherein the at least one processor is further configured to:

generate a reference frame for the inter prediction, wherein the attribute data is predicted based on the reference frame, wherein the attribute data is predicted based on a depth of an octree and wherein the attribute data is predicted based on information related to a motion vector.

5. The point cloud data encoding device of claim 4, wherein the at least one processor is further configured to compare a cost for splitting an octree node with a cost for predicting points of the octree node based on the motion vector, and predict the points of the octree node based on the motion vector in response to a cost comparison result.

6. The point cloud data encoding device of claim 5, wherein a bitstream including the geometry data and the attribute data includes information for whether the octree node is split and identifier information of the reference frame.

7. A point cloud data decoding method comprising:

decoding geometry data of point cloud data based on inter prediction, wherein the geometry data represents a position of a point;

decoding attribute data of the point cloud data based on inter prediction;

wherein the attribute data represents an attribute of the point, wherein the decoding of the geometry data includes:

generating a reference frame for the inter prediction, wherein the geometry data is predicted by providing a geometry residual based on the reference frame, wherein the decoding of the attribute data includes:

generating a reference frame for the inter prediction, wherein the attribute data is predicted based on the reference frame, wherein the attribute data is predicted based on a depth of an octree and wherein the attribute data is predicted based on information related to a motion vector.

8. The point cloud data decoding method of claim 7, wherein:

a bitstream including the geometry data and the attribute data includes motion vector information.

9. The point cloud data decoding method of claim 8, wherein:

the bitstream further includes information for whether an octree node is split; and the decoding the point cloud data includes predicting points of the octree node in response to the information for whether the octree node is split.

10. The point cloud data decoding method of claim 9, wherein the bitstream further includes identifier information of the reference frame and information on a specific depth range of the octree.

11. A point cloud data decoding device comprising:

a memory; and at least one processor connected to the memory, the at least one processor configured to:

decode geometry data of point cloud data based on inter prediction, wherein the geometry data represents a position of a point;

decode attribute data of the point cloud data based on inter prediction;

wherein the attribute data represents an attribute of the point, wherein the at least one processor is further configured to:

generate a reference frame for the inter prediction, wherein the geometry data is predicted by providing a geometry residual based on the reference frame, wherein the at least one processor is further configured to:

generate a reference frame for the inter prediction, wherein the attribute data is predicted based on the reference frame, wherein the attribute data is predicted based on a depth of an octree and wherein the attribute data is predicted based on information related to a motion vector.

12. The point cloud data decoding device of claim 11, wherein:

a bitstream including the geometry data and the attribute data includes motion vector information.

13. The point cloud data decoding device of claim 12, wherein the decoder predicts points of an octree node in a specific depth range of the octree based on the motion vector information.

14. The point cloud data decoding device of claim 13, wherein:

the bitstream further includes information for whether the octree node is split; and the decoder predicts points of the octree node in response to the information for whether the octree node is split.

15. The point cloud data decoding device of claim 14, wherein the bitstream further includes identifier information of the reference frame and information on a specific depth range of the octree.

* * * * *